United States Patent

Takahashi et al.

[11] Patent Number: 5,838,342
[45] Date of Patent: Nov. 17, 1998

[54] IMAGE OUTPUT APPPARATUS AND IMAGE FORMATION SYSTEM FOR CORRECTING DENSITY UNEVENNESS

[75] Inventors: Kazuyoshi Takahashi, Kawasaki; Takashi Watanabe, Yokohama; Toshiyuki Yanaka, Tokyo, all of Japan

[73] Assignee: Canon Kabushiki Kaisha, Tokyo, Japan

[21] Appl. No.: 901,558

[22] Filed: Jul. 28, 1997

Related U.S. Application Data

[63] Continuation of Ser. No. 281,159, Jul. 27, 1994, abandoned.

[30] Foreign Application Priority Data

Jul. 30, 1993 [JP] Japan ..................... 5-190052

[51] Int. Cl.⁶ ............................................. B41J 2/01
[52] U.S. Cl. ............................................... 347/19
[58] Field of Search ........................ 347/9, 19, 5, 106; 358/504, 406

[56] References Cited

U.S. PATENT DOCUMENTS

| | | | |
|---|---|---|---|
| 4,675,696 | 6/1987 | Suzuki | 347/19 |
| 4,725,849 | 2/1988 | Koike et al. | 347/106 |
| 5,428,380 | 6/1995 | Ebisawa | 347/35 |

FOREIGN PATENT DOCUMENTS

| | | |
|---|---|---|
| 0454479 | 10/1991 | European Pat. Off. . |
| 0461759 | 12/1991 | European Pat. Off. . |
| 3-18358 | 1/1991 | Japan . |
| 5330083 | 12/1993 | Japan . |

OTHER PUBLICATIONS

Patent Abstracts of Japan, vol. 16, No. 549, JP-A-04208468, Nov. 18, 1992.
Patent Abstracts of Japan, vol. 15, No. 293, JP-A-03104977, Jul. 25, 1991.
Patent Abstracts of Japan, vol. 15, No. 158, JP-A-03028727, Feb. 6, 1991.

*Primary Examiner*—N. Le
*Assistant Examiner*—Craig A. Hallacher
*Attorney, Agent, or Firm*—Fitzpatrick, Cella, Harper & Scinto

[57] ABSTRACT

A test image is formed by performing overlap printing using a plurality of printing heads provided for a printing agent of one color. Density data attained by reading this test image is averaged. On the basis of this average value, a common correction is performed for drive signals for the printing heads. This makes it possible to perform head density unevenness correction at a high efficiency in performing overlap printing by using the plurality of printing heads.

23 Claims, 27 Drawing Sheets

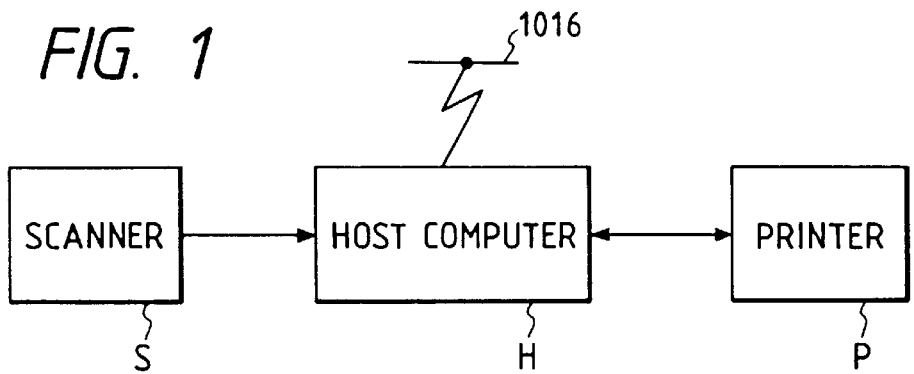
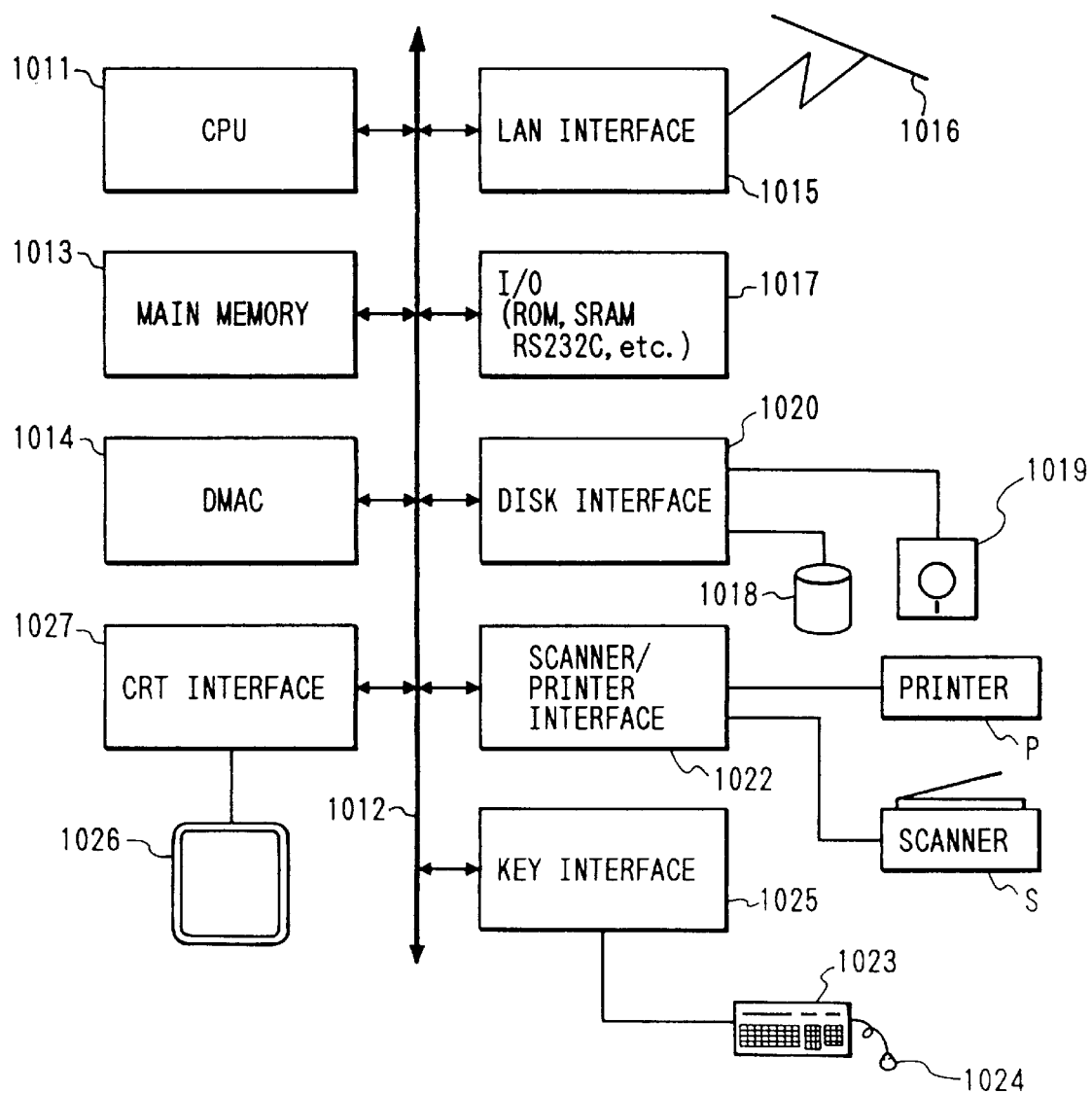

FIG. 13

| PALLET DATA | CYAN | MAGEN-TA | YELLOW | BLACK | S1 | --- | S4 |
|---|---|---|---|---|---|---|---|
| 0 | 10 | 10 | 10 | 0 | 0 | --- | 0 |
| 1 | 0 | 0 | 0 | 0 | 255 | --- | 0 |
| 2 | 0 | 0 | 0 | 0 | 0 | --- | 255 |
| 3 | 150 | 150 | 0 | 0 | 0 | --- | 0 |
| 4 | 0 | 0 | 0 | 255 | 0 | --- | 0 |
| 5 | 0 | 200 | 200 | 0 | 0 | --- | 0 |
| 6 | 0 | 250 | 100 | 0 | 0 | --- | 0 |
| ⋮ | ⋮ | ⋮ | ⋮ | ⋮ | ⋮ | ⋮ | ⋮ |
| 254 | 0 | 0 | 255 | 0 | 0 | --- | 0 |
| 255 | 0 | 0 | 0 | 0 | 0 | --- | 0 |

FIG. 14

| PALLET DATA | CYAN | MAGEN-TA | YELLOW | BLACK | S1 | --- | S4 |
|---|---|---|---|---|---|---|---|
| 0 | 0 | 0 | 0 | 0 | 0 | --- | 0 |
| 1 | 0 | 0 | 0 | 0 | 0 | --- | 0 |
| 2 | 0 | 0 | 0 | 0 | 0 | --- | 0 |
| 3 | 0 | 0 | 0 | 0 | 0 | --- | 0 |
| 4 | 0 | 0 | 0 | 0 | 0 | --- | 0 |
| 5 | 0 | 0 | 0 | 0 | 0 | --- | 0 |
| 6 | 0 | 0 | 0 | 0 | 0 | --- | 0 |
| ⋮ | ⋮ | ⋮ | ⋮ | ⋮ | ⋮ | ⋮ | ⋮ |
| 254 | 0 | 0 | 0 | 0 | 0 | --- | 0 |
| 255 | 0 | 0 | 0 | 0 | 0 | --- | 0 |

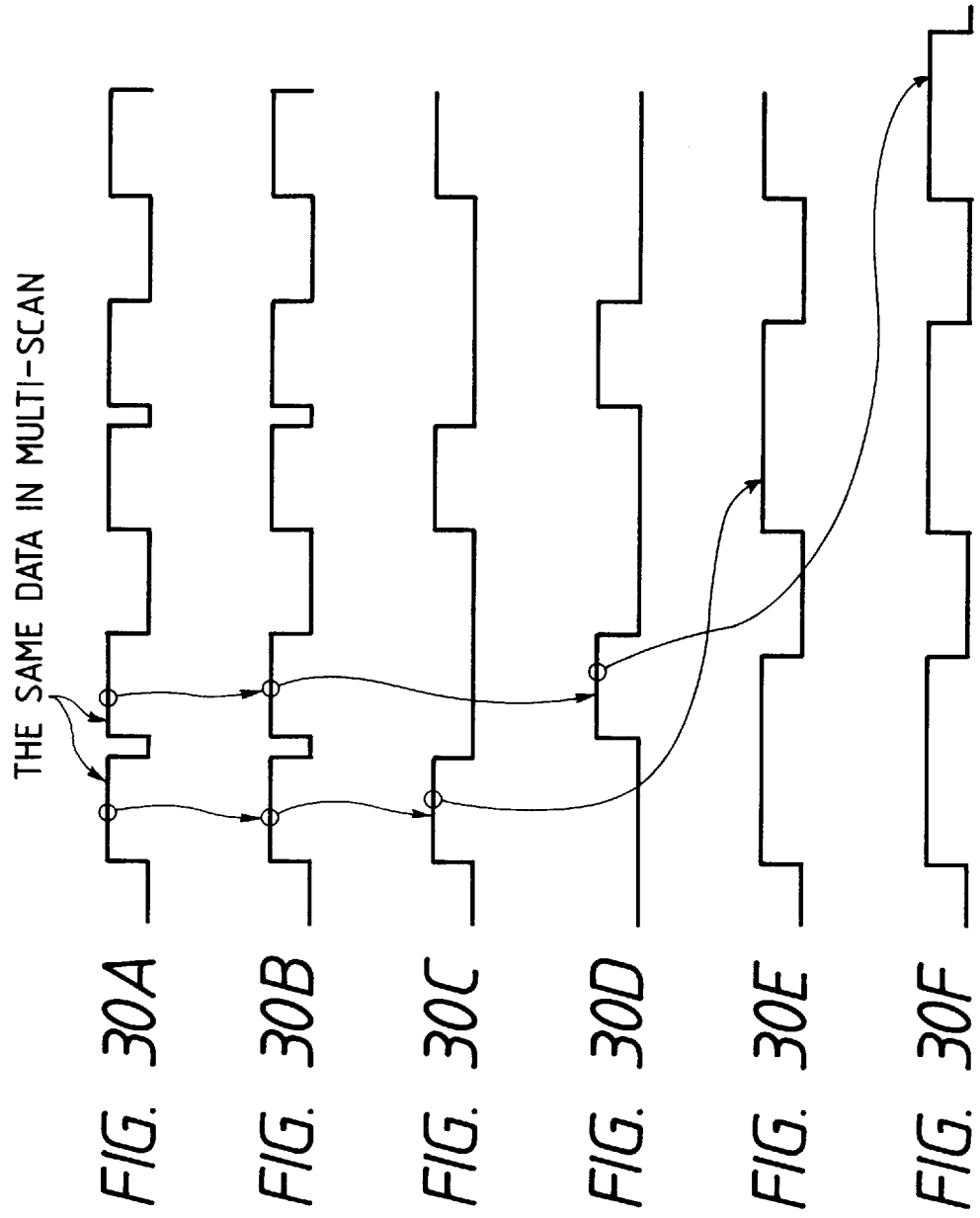

IMAGE OUTPUT APPPARATUS AND IMAGE FORMATION SYSTEM FOR CORRECTING DENSITY UNEVENNESS

This application is a continuation of application Ser. No. 08/281,159 filed Jul. 27, 1994 abandoned.

BACKGROUND OF THE INVENTION

1. Field of the Invention

The present invention relates to an image output apparatus for forming (outputting) an image on a printing medium, an image formation system including the image output apparatus and an image supply apparatus for supplying image data to the image output apparatus, an image output method, and a printed matter which is printed by the image output method. For example, the present invention relates to a textile printing system which uses a piece or roll of cloth as a printing medium and prints an image on the cloth.

2. Related Background Art

As an image output apparatus, those which perform digital image printing by using a printing head of ink jet type or thermal transfer type have spread rapidly in recent years. Generally, such an image output apparatus uses a printing head (to be referred to as a multi-head in this section) in which a plurality of printing elements are integrated, in order to increase the printing speed.

For example, as an ink jet printing head, a so-called multi-nozzle head in which a plurality of ink orifices and liquid passages are integrated is generally used. In addition, in a thermal head of thermal transfer type or heat-sensitive type, it is common practice to integrate a plurality of heaters.

It is, however, difficult to uniformly manufacture printing elements of a multi-head due to, e.g., characteristic variations in the manufacture process or variations in the head constituent material. The result is a variation to a certain degree in the characteristics of the individual printing elements. As examples, a variation is brought about in the shape of orifices or liquid passages in the multi-nozzle head, and the shape or the resistance of heaters varies in the thermal head. This nonuniformity in the characteristics of the printing elements appears as nonuniformity in the size or the density of dots printed by the individual printing elements. Consequently, density unevenness takes place in a printed image.

To solve the above problem, the present applicant has proposed, in Japanese Laid-Open Patent Application No. 3-18358 and the like, an image formation apparatus in which a density unevenness reading unit is provided to periodically read the density unevenness distribution within the range of an array of printing elements, thereby reforming density unevenness correction data. In this apparatus, even if the density unevenness distribution of a head changes, the correction data is reformed in correspondence with the change. Therefore, it is possible to ensure uniform images free from unevenness at any instant.

Recently, advanced image output apparatuses have been developed in which a plurality of printing heads are provided for a printing agent of one color, and these printing heads are caused to perform either overlap printing on the same line in order to improve the print quality, or printing on different lines in order to increase the printing speed. If such an image output apparatus is for color printing, a plurality of printing heads are provided for each of printing agents of different colors.

SUMMARY OF THE INVENTION

It is an object of the present invention to provide an arrangement which performs overlap printing by using a plurality of printing heads provided for a printing agent of one color, and in which density unevenness correction can be performed efficiently for each of the printing heads.

It is another object of the present invention to perform appropriate density unevenness correction in both overlap printing and non-overlap printing.

To achieve the above objects, the present invention provides an image output apparatus which outputs an image on a printing medium by using a plurality of printing heads provided for a printing agent of one color and each having a plurality of printing elements, comprising image forming means for causing the printing heads to form a test image, reading means for reading the test image formed by the image forming means, and correcting means for performing a common correction for drive signals corresponding to the printing heads on the basis of the result read by the reading means.

The present invention also provides an image output method which outputs an image on a printing medium by using a plurality of printing heads provided for a printing agent of one color and each having a plurality of printing elements, comprising the steps of causing the printing heads to form a test image, reading the test image formed by the image forming step, and performing a common correction for drive signals corresponding to the printing heads on the basis of the result read by the reading step.

In the above apparatus or method, the test image can be one test image formed by performing overlap printing by using the printing heads.

The correction can be performed on the basis of an average value calculated by averaging density data, which is obtained by reading the test image, by the number of printing heads.

It is also possible to cause the printing heads to form their respective test images, and to separately correct the drive signals corresponding to the printing heads on the basis of individual density data obtained by reading the test images.

In this case, it is possible to time-divisionally perform the processing for separately correcting the drive signals corresponding to the printing heads.

Furthermore, the printing heads can be arranged in the conveyance direction of the printing medium to allow overlap printing or non-overlap printing on the printing medium using the printing heads. In this case, it is possible to perform the common correction when the overlap printing is to be executed, and the separate correction when the non-overlap printing is to be executed.

In the above arrangement, a plurality of such printing heads can be provided for each of printing agents of different colors.

The printing head can be an ink jet printing head which uses an ink as the printing agent and ejects the ink. This ink jet printing head can have an element for generating thermal energy, which causes film boiling in the ink, as energy to be used to eject the ink.

The above image output apparatus is applicable to a textile printing system using cloth as a printing medium.

The present invention further provides an image formation system comprising the above image output apparatus and an image supply apparatus for supplying image data relating to printing to the image output apparatus.

Another image formation system of the present invention comprises the above image output apparatus and an image supply apparatus for supplying to the image output apparatus a command for performing the overlap printing or the non-overlap printing, in addition to image data relating to printing.

Furthermore, a printed matter of the present invention is manufactured by the above method.

Also, in the present invention, this printed matter is processed to obtain a processed product. This processed product can be obtained by cutting the printed matter into a desired size and performing a step of obtaining a final processed product for each separated piece. The step of obtaining a final processed product can be sewing, and the final processed product can be clothing.

According to the present invention, one test image, for example, is formed by a plurality of printing heads provided for a printing agent of one color. Density data obtained by reading this test image is averaged by the number of heads. On the basis of this average value, a common correction is performed for drive signals for the printing heads. This makes it possible to efficiently perform the head density unevenness correction when overlap printing is to be executed by using the plurality of printing heads.

The apparatus of the present invention further comprises means for causing the plurality of printing heads to form their respective test images, and means for separately correcting drive signals for the printing heads on the basis of individual density data obtained by reading the test images. Therefore, since density unevenness correction is separately performed for the drive signals in non-overlap printing, a proper correction corresponding to the print mode is possible.

BRIEF DESCRIPTION OF THE DRAWINGS

FIG. 1 is a block diagram showing the overall arrangement of a textile printing system according to an embodiment of the present invention;

FIG. 3 is a block diagram showing the system, particularly the arrangement of a host computer according to the embodiment of the present invention;

FIG. 13 is a view for explaining an example of the data to be developed in pallet conversion table memories in FIG. 11;

FIG. 14 is a view for explaining data which is set in each memory in FIG. 11 to prevent an abnormal output until conversion parameters are input;

FIGS. 30A to 30F are timing charts showing examples of the timings from readout of image data to head driving when two heads are driven by using two HS data.

DETAILED DESCRIPTION OF THE PREFERRED EMBODIMENT

An embodiment of the present invention will be described in detail below with reference to the accompanying drawings.

Note that in the following description, a textile printing system, as one preferred embodiment of the present invention, will be explained in the order below.

(1) Overall arrangement of system (FIGS. 1 and 2)
(2) Host computer (FIG. 3)
(2. 1) Arrangement
(2. 2) Operation
(3) Printer (FIGS. 4 to 31F)
(3. 1) Explanation of printing mechanism
(3. 2) Explanation of arrangement of apparatus
(3. 3) Explanation of printing schemes
(3. 4) Explanation of head shading
(4) Others (1) Overall arrangement of system FIG. 1 shows the overall arrangement of a textile printing system according to the embodiment of the present invention. A host computer H constitutes a data supply apparatus for supplying, e.g., original image data and other control commands for textile printing to a printer P for performing printing (to be also referred to as recording or print hereinafter) for a printing medium such as cloth. It is possible by using this host computer H to perform desired correction for an original image, which is made by a designer and read by a scanner S, and to set necessary parameters in the printer P, thereby causing the printer P to perform textile printing. The host computer H can also communicate with, e.g., other systems through a LAN (Local Area Network) 1016. In addition, the host computer H is informed of the status or the like of the printer P. Details of the host computer H and the printer P are described later with reference to FIGS. 3 and 4, respectively.

Figure 2:
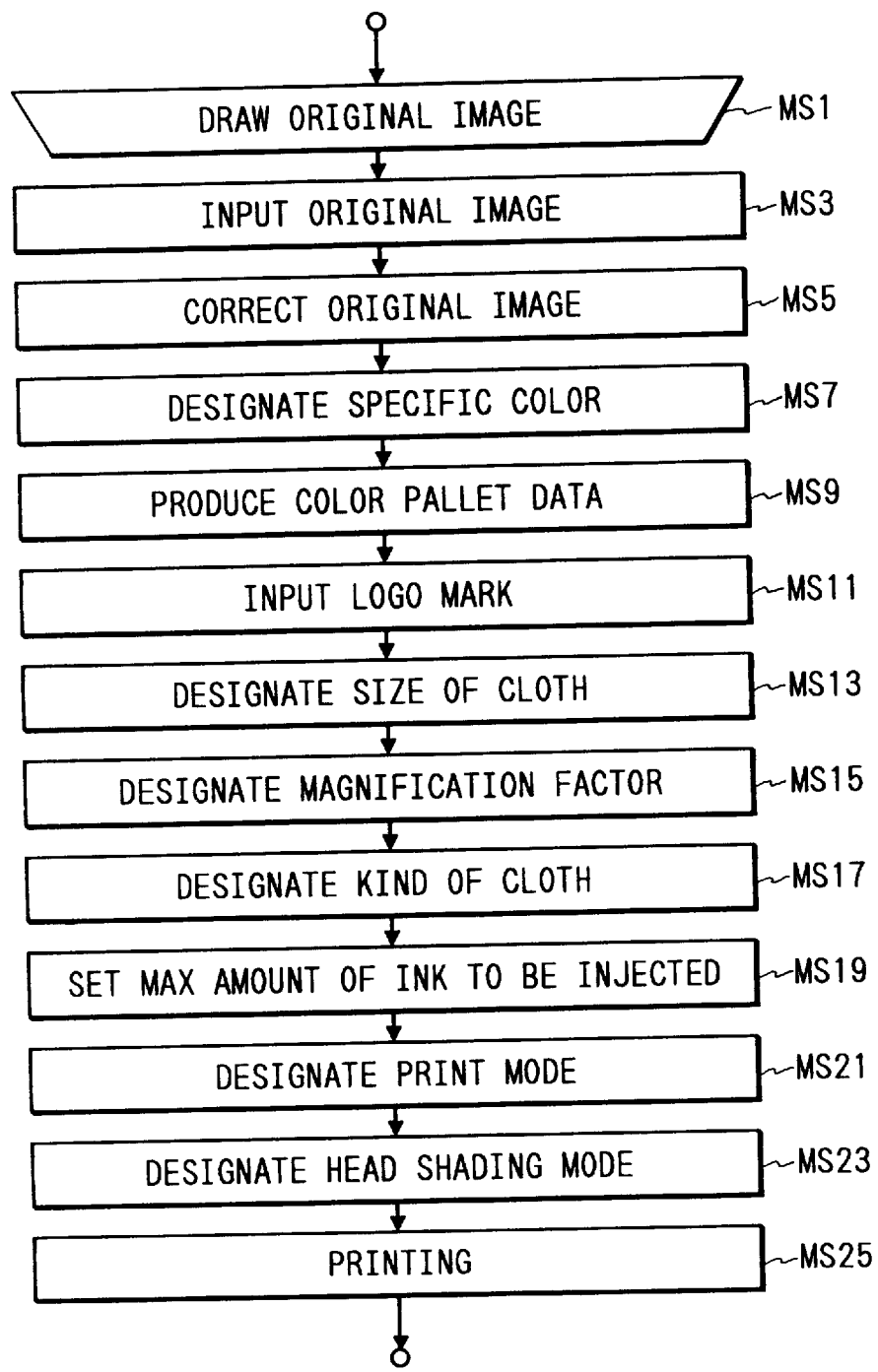
FIG. 2 is a flow chart showing the outline of a textile printing procedure of the embodiment.

FIG. 2 shows an example of a textile printing procedure that can be carried out by using this system. The contents of processing activities performed in the individual steps are, for example, as follows.

Original image drawing step MS1

In this step, a designer draws an original image, i.e., a basic image serving as a basic unit of repeating images to be formed on cloth as a printing medium, by using some appropriate means. In the drawing of an image, it is also possible to use desired units, e.g., an input means or a display means of the host computer H to be described in detail later with reference to FIG. 3.

Original image input step MS3

In this step, one of the following operations is performed: the original image drawn in the original image drawing step M1 is read and loaded in the host computer H by using the scanner S; original image data stored in an external memory of the host computer H is read out and loaded; and original image data is received from the LAN 1016.

Original image correction step MS5

As will be described later with reference to FIG. 24, the textile printing system of this embodiment allows selection from various repeating patterns with respect to a basic image. Depending on the type of a selected repeating pattern, however, an unwanted positional deviation or color discontinuity of an image may occur in the boundaries between the patterns. This step, therefore, permits selection of a repeating pattern and at the same time corrects discontinuity in the boundaries between the repeating patterns thus selected. This correction can be done by a designer or an operator by using a mouse or some other input means while monitoring the screen of a display that the host computer H has. Alternatively, the correction can be performed automatically by image processing by the host computer H itself.

Specific color designation step MS7

The printer P according to this embodiment basically performs printing by using ink components of yellow (Y), magenta (M), cyan (C), and, if necessary, black (BK). In textile printing, however, it is sometimes desired to use colors other than these colors, e.g., metallic colors such as gold and silver, or vivid colors such as red (R), green (G), and blue (B). In the printer P of this embodiment, therefore, printing using these special colors (to be referred to as specific colors hereinafter) is made possible. In this step, designation of this specific color is performed.

Color pallet data production step MS9

In designing, a designer draws an original image by choosing colors from a standard color patch. The reproducibility during printing of each chosen color has a large influence on the productivity of the textile printing system. In this step, therefore, data for determining the mixing ratio of Y, M, C, and/or a specific color for reproducing a selected standard color well is produced.

Logo mark input step MS11

In the case of piece goods, a logo mark indicating the brand or the like of a designer or a manufacturer is printed on the edge portions of the material in many instances. In this step, items such as a logo mark and its color, size, position, and the like are designated.

Size of cloth designation step MS13

The width, the length, and the like of cloth as an object to be printed are designated. This consequently determines the scanning amounts of a printing head in the main scan direction and the subscan direction in the printer P or the repeating number of an original pattern.

Magnification factor designation step MS15

A magnification factor (e.g., 100%, 200%, or 400%) in printing with respect to an original image is designated.

Kind of cloth designation step MS17

There are various kinds of cloth, e.g., natural fibers such as cotton, silk, and wool, and synthetic fibers such as nylon, polyester, and acrylic fibers available, and different fibers have different characteristics in relation to textile printing. That is, the way in which a stripe appears in the boundary for each main scan varies from one kind of cloth to another for the same feed amount in printing, and this is considered to be caused by the difference in stretchability of the cloth. In this step, therefore, the kind of cloth to be used in printing is input and used to set a proper feed amount in the printer P.

Maximum amount of ink to be injected setting step MS19

An image density reproduced on cloth changes in accordance with the kind of cloth even if the same amount of ink is injected on the cloth. In addition, the ink amount that can be injected varies in accordance with the arrangement or the like of a fixing system of the printer P. In this step, therefore, a maximum amount of ink to be injected is designated in accordance with the kind of cloth or the arrangement or the like of a fixing system of the printer P.

Print mode designation step MS21

In this step, the print mode of the printer P is designated. That is, it is designated whether a high-speed print mode (see FIG. 20) in which no overlap printing is performed by multi-scan is to be executed, or a mode (see FIGS. 18 and 19) in which overlap printing is performed by multi-scan is to be executed, or whether ink injection is to be performed once or a plurality of number of times for one dot. It is also possible to designate whether, if printing is interrupted, control is to be so performed that the pattern after the interruption continues the pattern before that, or printing is to be newly started regardless of the continuity of the pattern.

Head shading mode designation step MS23

When a printing head having a plurality of orifices is used in the printer P, a variation or deviation may occur in the ink ejection amounts or ejection directions of the orifices of the head depending on variations in the manufacture or on the use state after the manufacture. To correct this, therefore, processing (head shading) for maintaining the print density constant by correcting drive signals for the individual orifices is sometimes executed. In this step, it is possible to designate the manner and the timing of the head shading in correspondence with the print mode.

Printing step MS25

Textile printing is executed by the printer P on the basis of the above designations.

Note that if any of the above designations need not be performed, the corresponding step can be eliminated or skipped. Note also that steps for performing other designations or the like may be added if necessary.

(2) Host computer (2. 1) Arrangement

FIG. 3 is a block diagram showing the overall system, particularly the arrangement of the host computer according to the embodiment of the present invention.

Referring to FIG. 3, a CPU 1011 controls the overall information processing system. A main memory 1013 is used to store programs to be executed by the CPU 1011 and as a work area during the execution. A DMA controller (Direct Memory Access Controller; to be referred to as a DMAC hereinafter) 1014 transfers data between the main memory 1013 and various other units constituting this system independent of the CPU 1011. A LAN interface 1015 is provided between the LAN 1016 and this system. An input/output unit (to be referred to as an I/O hereinafter)

1017 has a ROM, an SRAM, an RS232C interface, and the like. Various external equipment can be connected to the I/O 1017. A hard disk unit 1018 and a floppy disk unit 1019 are used as external memories. A disk interface 1020 connects signals between both of the hard disk unit 1018 and the floppy disk unit 1019 and this system. A scanner/printer interface 1022 connects signals between both of the printer P and the scanner S and the host computer H. The scanner/printer interface 1022 can be of a GPIB specification. A keyboard 1023 is for entering various character information and control information. A mouse 1024 is used as a pointing device. A key interface 1025 connects signals between both of the keyboard 1023 and the mouse 1024 and this system. A display unit 1026 is, e.g., a CRT whose display is controlled by an interface 1027. A system bus 1012 consists of a data bus, a control bus, and an address bus and connects signals between the above individual units.

(2. 2) Operation

A designer or an operator operates the system constructed by connecting the various units discussed above in correspondence with various information displayed on the display screen of the CRT 1026. That is, the CRT 1026 displays on its display screen character or image information supplied from external equipment connected to the LAN 1016 or the I/O 1017, or from the hard disk unit 1018, the floppy disk unit 1019, the scanner S, the keyboard 1023, or the mouse 1024. The CRT 1026 also displays operation information related to system operations stored in the main memory 1013. While monitoring this display, a designer or an operator designates various information or enters commands for the system.

(3) Printer (3. 1) Explanation of mechanical arrangement

Figure 4:
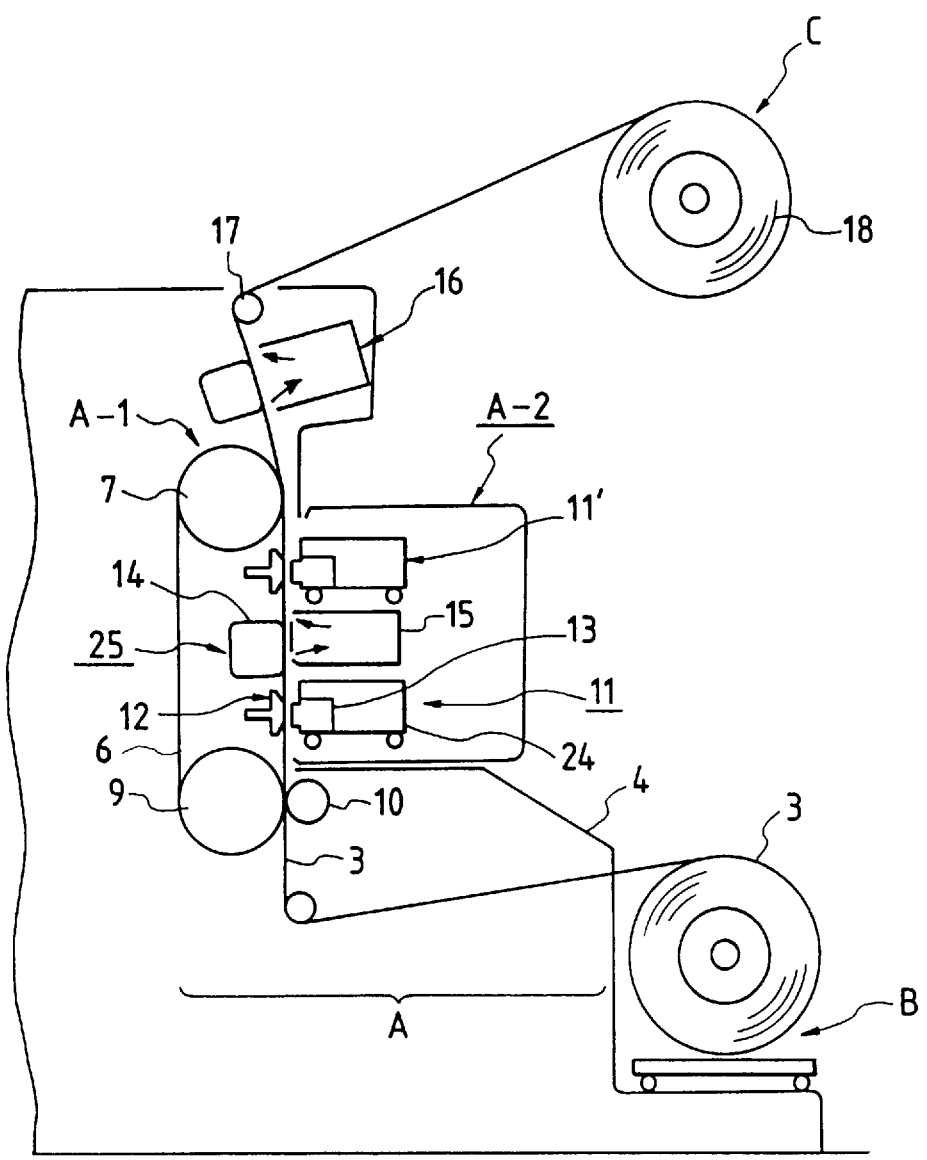
FIG. 4 is a side sectional view schematically illustrating the mechanical arrangement of a printer to be applied to the embodiment.
Figure 5:
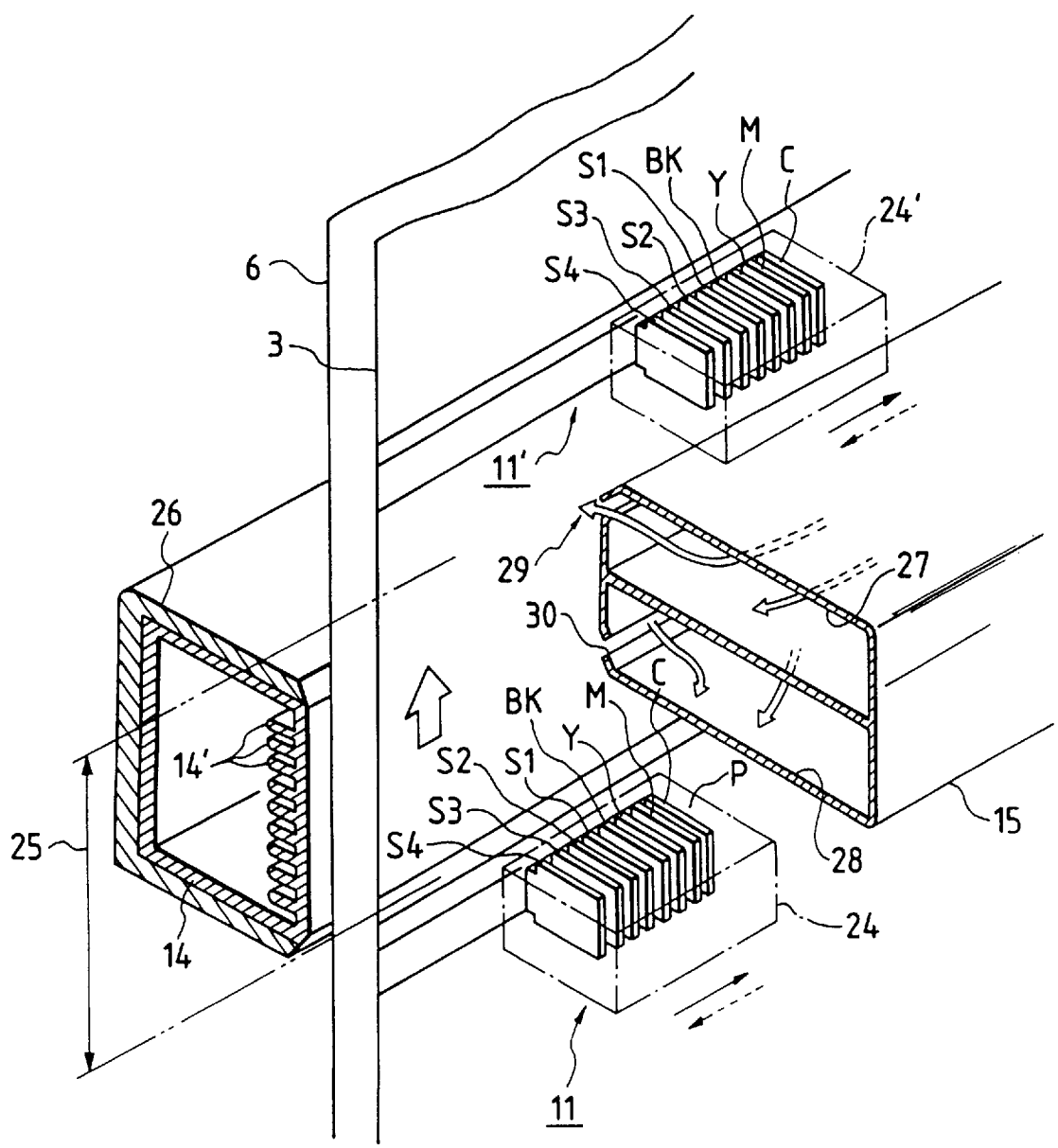
FIG. 5 is a perspective view showing an example of the arrangement of a printing head and its peripheral portion.

FIG. 4 shows a practical arrangement of an ink jet printer as a textile printing apparatus of this embodiment. FIG. 5 is an enlarged perspective view showing the main parts of the printer. The textile printing apparatus (printer) of this embodiment is roughly divided into a cloth supply section B, a main body A, and a winding section C. The cloth supply section B supplies cloth from a roll of pretreated cloth for textile printing. The main body A precisely feeds the supplied cloth in units of lines and performs printing by using an ink jet head. The winding section C dries and winds the printed cloth. The main body A is subdivided into a cloth precision feed section A-1 including a platen and a printing section A-2.

Cloth 3 is supplied from a roll of pretreated cloth to the paper supply section and fed to the main body A. In the main body, a thin endless belt 6 which is precisely step-driven is looped between a driving roller 7 and a roller 9. The driving roller 7 is step-driven directly by a high-resolution stepping motor (not shown) to step-feed the belt by the step amount. The supplied cloth is pushed by a push roller 10 against the belt surface which is backed up by the roller 9, and thereby the surface to be printed is flattened.

The position of the cloth 3 which is step-fed by the belt 6 is regulated in position by a platen 12 arranged behind the belt in a first printing unit 11. The cloth 3 is then printed from the front surface side by an ink jet head 13. Each time printing for one line ends, the cloth is step-fed by a predetermined amount and dried by heat supplied from the belt rear surface side by a heating plate 14 and by warm air from the front surface side, which is supplied and exhausted by a warm air duct 15. Subsequently, overlap printing is performed in a second printing unit 11' in the same fashion as in the first printing unit. Note that the warm air duct 15 is not necessarily provided. That is, even if this unit is omitted, the cloth is also naturally dried in the region from the first printing unit 11 to the second printing unit 11'.

The printed cloth is peeled and again dried by a post-drying unit 16 similar to the heating plate 14 and the duct 15. The dried cloth is then guided by a guide roll 17 and wound by a winding roll 18. The roll of wound cloth is removed from the apparatus and processed into products through color formation, cleaning, and drying performed in a batch manner.

Referring to FIG. 5, the cloth 3 as a printing medium which is supported by the belt 6 is step-fed toward the upper portion of the figure. In the first printing unit 11 illustrated in the lower portion of the figure, there is a first carriage 24 mounting ink jet heads for Y, M, C, BK, and specific colors S1 to S4. An ink jet head (a printing head) used in this embodiment has an element for generating thermal energy which causes film boiling in an ink, as energy to be used in ejecting the ink. 128 orifices are arranged at a density of 400 DPI (dots/inch) in each ink jet head.

A drying unit 25 constituted by the heating plate 14 for heating the belt from the rear surface side and the warm air duct 15 for drying the belt from the front surface side is provided downstream of the first printing unit. The drying performed by this drying unit 25 is for primarily evaporating an ink solvent adhered on the printing medium and is therefore different from a diffusion or fixing step to be described later. The heat-transfer surface of the heating plate 14 is pushed against the endless belt 6 which is applied with a high tension, and strongly heats the conveyor belt 6 from behind with high-temperature, high-pressure vapor flowed through the inner hollow portion. Fins 14' for collecting heat are provided inside the heating plate surface. The fins 14' make it possible to efficiently concentrate heat at the rear surface of the belt. The surfaces of the heating plate not in contact with the belt 6 are covered with a heat-insulating member 26 so as to prevent loss of heat caused by radiation.

A supply duct 27 on the downstream side blows lower-humidity, warm air against the front surface side of the cloth which is being dried, thereby enhancing the drying effect. The air flowing in the direction opposite to the conveyance direction of the cloth and containing a large quantity of moisture is sucked via a suction duct 28 on the upstream side by an amount far larger than the blowing amount. This prevents the evaporated water from leaking and condensing on the surrounding mechanical parts. A warm air supply source is provided at a position deep in the plane of the paper of FIG. 5, and the suction is performed from the front. Therefore, the pressure difference between a blowing slit 29 and a suction slit 30 is uniform throughout the entire region in the longitudinal direction. The air blowing/suction unit is offset toward the downstream side from the center of the heating plate on the rear surface side, so air is blown against a portion heated sufficiently. These features make it possible to strongly dry a large amount of moisture of an ink including a diluting solution received by the cloth in the first printing unit 11.

The second printing unit 11' is provided downstream of (above) the first printing unit 11. The second printing unit is constituted by a second carriage 24' having an arrangement similar to that of the first carriage.

After the drying (including natural drying) as described above, a dyestuff, such as a dye, contained in the ink on the cloth fibers can be diffused and fixed to the fibers by using a means for fixing the dyestuff of the ink. It is possible by this step to obtain satisfactory color formation properties and fastness resulting from fixing of the dye.

This diffusion-fixing step (including the dye diffusion step and the fixing color formation step) can be performed by any conventional method, e.g., a steaming method (in which, for example, a treatment is performed in a steam atmosphere at 100° C. for 10 minutes). In this case, it is also possible to perform an alkali treatment, as a pretreatment, for the cloth prior to the printing step. The fixing step either involves or does not involve a reaction process, such as ion bonding, depending on the type of dye. An example of the latter is one in which a dye is impregnated in a fiber so as not to be physically removed. Any ink can be used as long as it contains a necessary dyestuff, and the dyestuff is not restricted to a dye but may be a pigment.

Thereafter, in a post-treatment, an unreacted dye and the substances used in the pretreatment are removed. Lastly, printing is completed through finishing steps such as defect correction and ironing.

Examples of the printing medium other than the cloth (cloth 3) are wall cloth, threads used in embroidery, and wall paper.

In the present invention, the term "cloth" includes all textiles and unwoven fabrics and any other cloth, regardless of the material, the way of weaving, and the way of knitting.

In particular, the cloth for ink jet textile printing is required to meet the following conditions:

(1) The color of an ink is formed at a sufficiently high density.
(2) The dye fixing ratio of an ink is high.
(3) An ink is dried rapidly on the cloth.
(4) Irregular ink smearing occurs little on the cloth.
(5) The conveyability of the cloth in an apparatus is high.

To meet these requirements, it is possible to perform a pretreatment for the cloth by using a means for making the cloth contain a treating agent, if necessary. As examples, Japanese Laid-Open Patent Application No. 62-53492 has disclosed cloth having an ink-receiving layer, and Japanese Laid-Open Patent Application No. 3-46589 has proposed cloth containing an anti-reducing agent or an alkaline substance. An example of such a pretreatment is a treatment for making cloth contain a substance selected from an alkaline substance, a water-soluble polymer, a synthetic polymer, a water-soluble metal salt, urea, and thiourea.

Examples of the alkaline substance are an alkali metal hydroxide such as sodium hydroxide and potassium hydroxide; amines such as mono-, di-, and tri-ethanol amines; and an alkali metal carbonate and an alkali metal bicarbonate such as sodium carbonate, potassium carbonate, and sodium bicarbonate. Other examples are an organic acid metal salt such as calcium acetate and barium acetate, and ammonia and an ammonia compound. It is also possible to use sodium trichloroacetate which changes into an alkaline substance under steaming and dry heat. The most preferred alkaline substances are sodium carbonate and sodium bicarbonate which are used in dyeing reactive dyes.

Examples of the water-soluble polymer are natural water-soluble polymers, e.g., a starch substance such as corn and wheat; a cellulose substance such as carboxymethylcellulose, methylcellulose, and hydroxyethylcellulose; polysaccharides such as sodium alginate, gum arabic, gum locust bean, gum tragacanth, gum guar, and a tamarind seed; a protein substance such as gelatin and casein; a tannin-based substance; and a lignin-based substance.

Examples of the synthetic polymer are a polyvinyl alcohol compound, a polyethylene oxide compound, an acrylic water-soluble polymer, and a maleic anhydride water-soluble polymer. Of these polymers, a polysaccharide polymer or a cellulose polymer is most preferred.

Examples of the water-soluble metal salt are compounds which form a typical ion crystal and have a pH of 4 to 10, such as halides of an alkaline metal and an alkaline earth metal. Representative examples of such compounds are NaCl, $Na_2SO_4$, KCl, and $CH_3COONa$, as alkaline metal compounds, and $CaCl_2$ and $MgCl_2$, as alkaline earth metal compounds. Of these, salts of Na, K, and Ca are most preferred.

The method of making cloth contain the above substance in the pretreatment is not particularly limited. Examples are a dipping method, a pad method, coating method, and a spray method which are regularly performed.

The textile printing ink to be applied to the cloth for ink jet textile printing is merely adhered to the cloth immediately after the application. Therefore, as described above, it is preferable to subsequently perform the step of fixing a dyestuff, such as a dye, contained in the ink into fibers. Such a fixing step can be any conventional method. Examples are a steaming method, an HT steaming method, and a thermofix method. When cloth not subjected to an alkali treatment is to be used, examples of the method are an alkali pad steam method, an alkali blotch steam method, an alkali shock method, and an alkali cold fix method.

After the above fixing step, removal of an unreacted dye and the substance used in the pretreatment can be performed by washing the printing medium with water or hot water, in which a neutral detergent is dissolved, by using a means for washing the printing medium in accordance with a conventional method. During this washing, it is preferable to simultaneously perform a conventionally known fixing treatment (a treatment for fixing a dye which may be separated if untreated).

The printed matter subjected to the post-treatment steps discussed above is then cut into a desired size. These separated pieces are subjected to steps, such as sewing, bonding, and welding, for forming final processed products, thereby producing clothes, e.g., one-piece dresses, dresses of other types, neckties, and swimsuits, or bed covers, sofa covers, handkerchiefs, and curtains. Methods for processing cloth into clothes or other housewares by sewing or the like are described in many known books.

Figure 6:
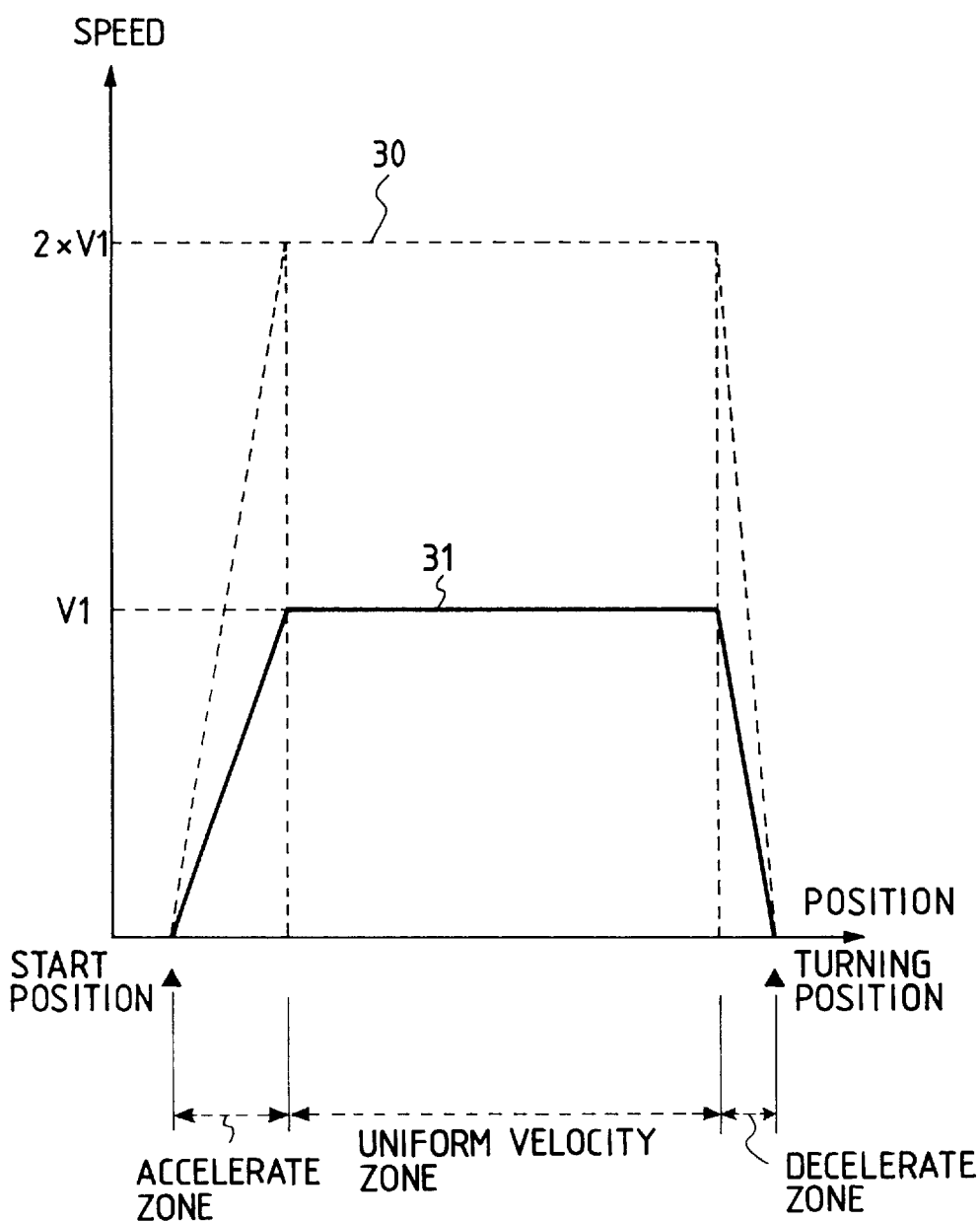
FIG. 6 is a graph for explaining the speed of a carriage which is scanned with the printing head mounted on it.

FIG. 6 explains a speed at which the carriages of the first and second printing units 11 and 11' shown in FIG. 4 scan on the surface of cloth to perform printing.

The movement of the carriage is as follows. That is, the carriage starts from a start position and gradually accelerates. The carriage moves at a uniform velocity in a printing zone (a uniform velocity zone). When the printing zone ends, the carriage decelerates in a decelerate zone and stops at a turning point.

Thereafter, the carriages starts returning to the start position. Commonly, return without printing is performed faster than return with printing in order to increase the productivity of the machine. In FIG. 6, a dotted line 30 indicates the movement when thinning printing is performed, and a solid line 31 indicates the movement in a mode in which the density is increased.

Figure 7:
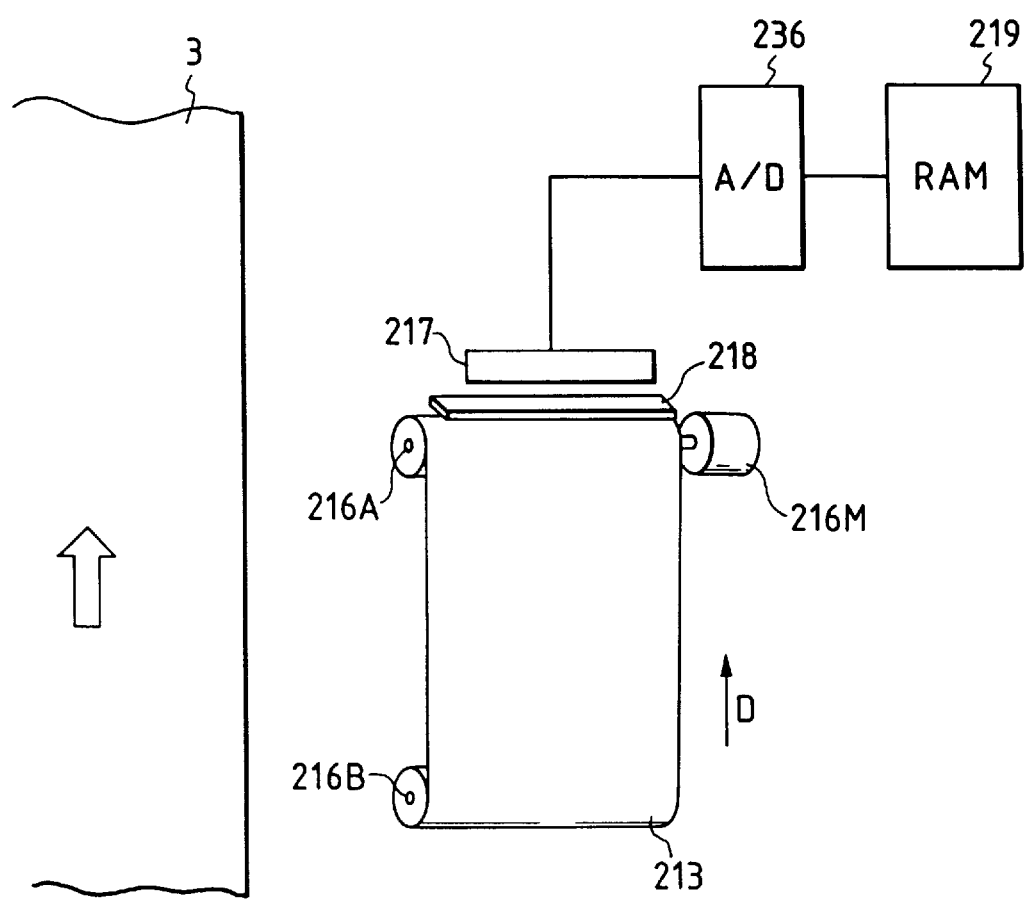
FIG. 7 is a schematic perspective view showing the arrangement of a density unevenness reading unit applicable to the printer of the embodiment.

FIG. 7 shows a density unevenness correction section 237 provided on the side of the apparatus away from the side illustrated in FIG. 5, and constituted by an HS test pattern printing unit and a test pattern reading unit. A printing medium 213 for test patterns is provided at the scan position of the upper and lower carriages, at which printing can be performed by the ink jet heads of the first and second printing units 11 and 11'. The printing medium 213 is extended between rollers 216A and 216B and conveyed in the direction of an arrow D by a motor 216M. As discussed earlier, the printing medium 213 on which test patterns are printed is illuminated by a light source 218. A reading line sensor 217 reads the print density of a test pattern printed on the printing medium 213 by each ink jet head. The read signal obtained by the reading line sensor 217 for the test pattern printed by each printing head is supplied, as R, G, and B signals, to an A/D converter 236, and converted into a digital signal. This digital signal is temporarily stored in a RAM 219.

(3. 2) Arrangement of control system of apparatus

Figure 8:
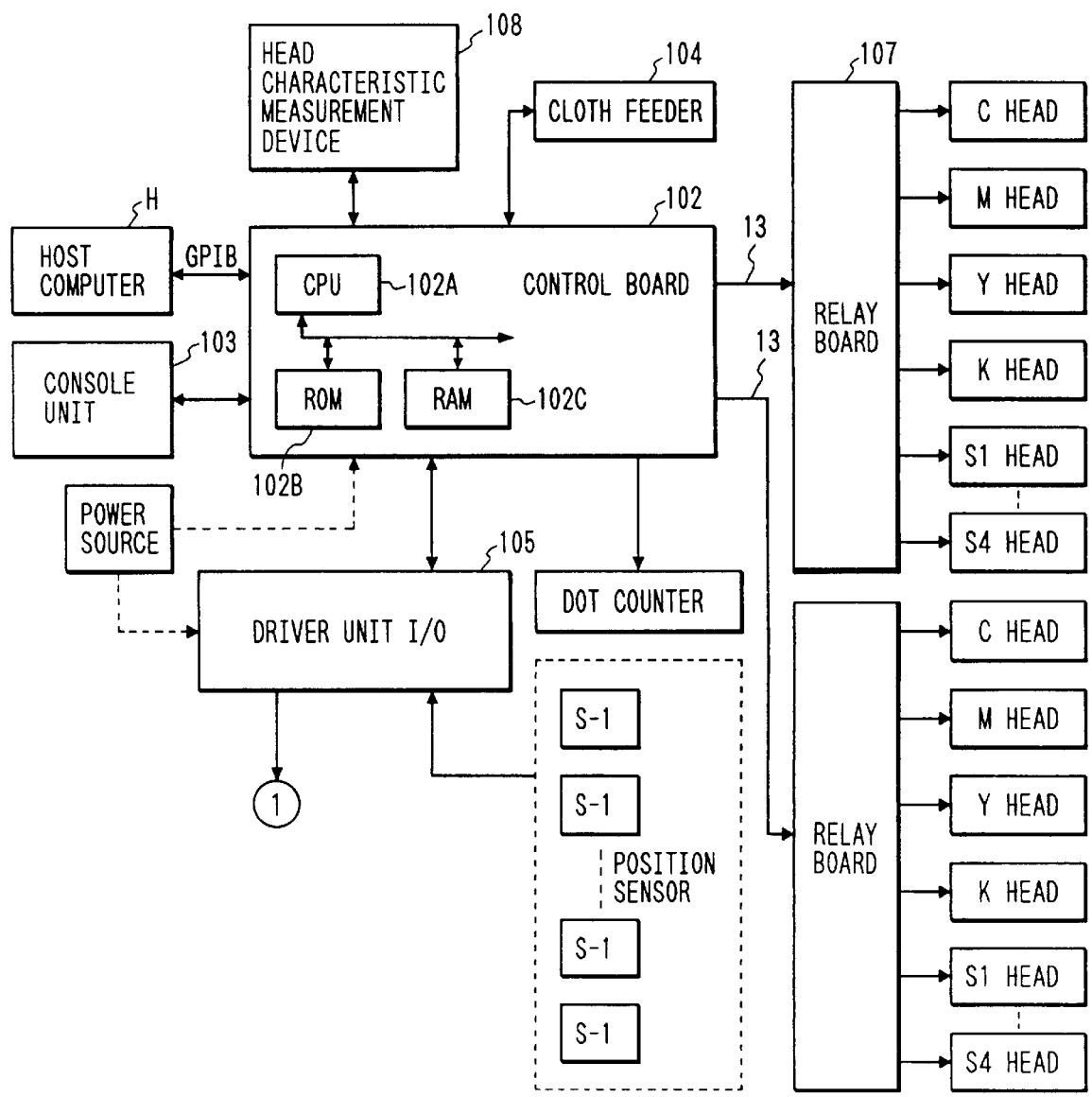
FIGS. 8 and 9 are block diagrams showing an electrical schematic arrangement of the printer in FIG. 4.
Figure 9:
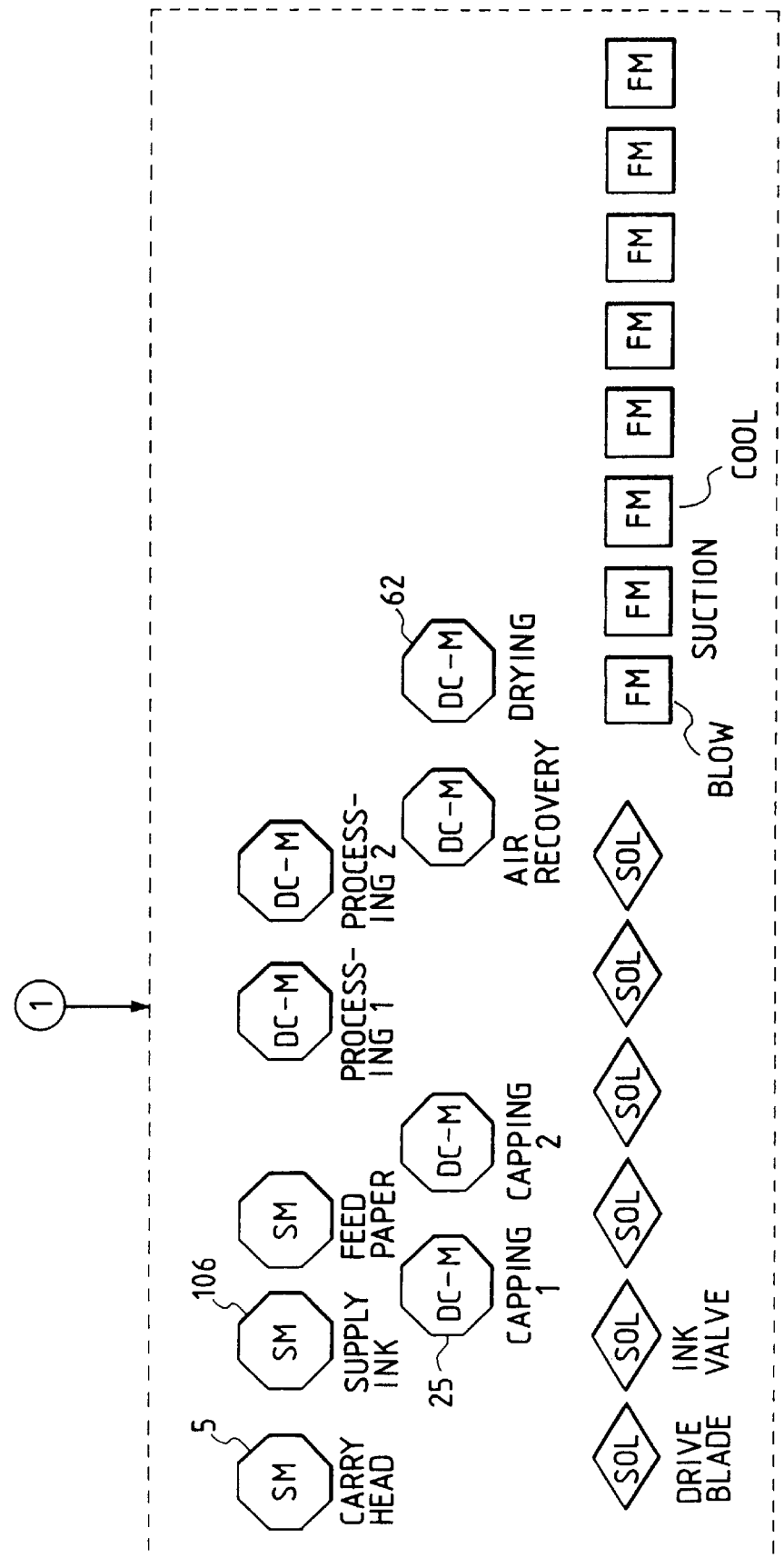
Figure 10:
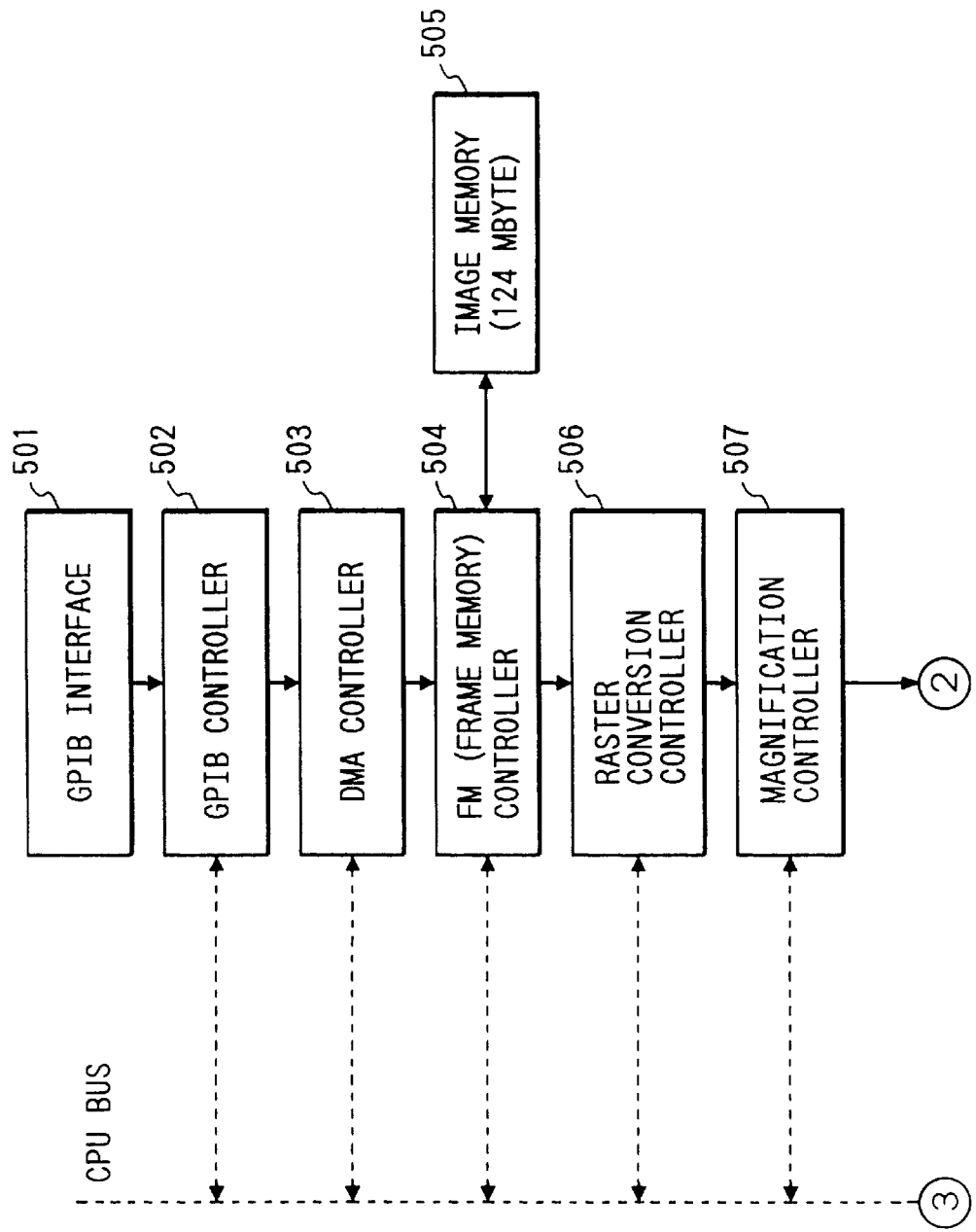
FIGS. 10 to 12 are block diagrams showing a portion of the inner arrangement of a control board in FIG. 8, particularly the flow of data in this portion.
Figure 11:
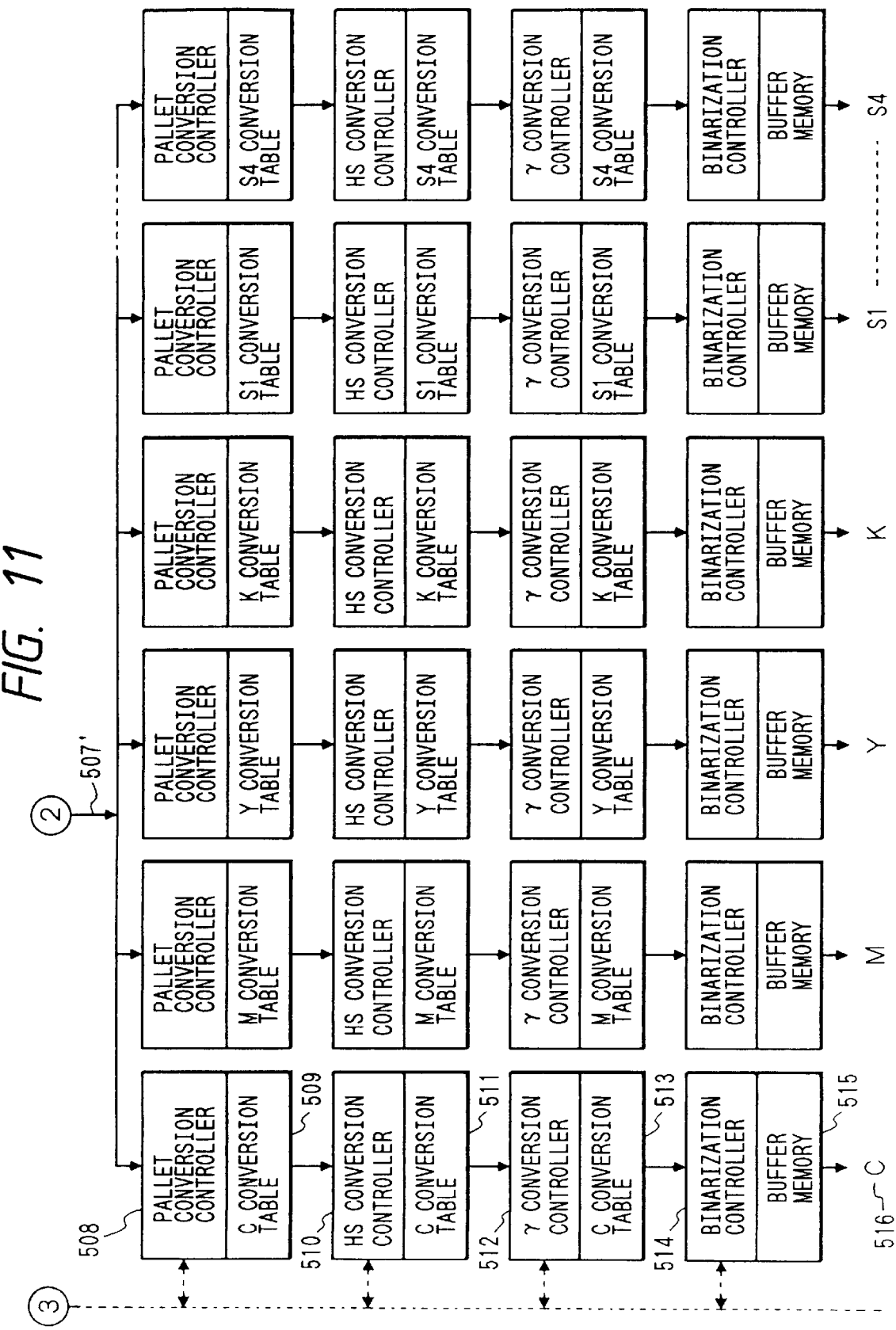
Figure 12:
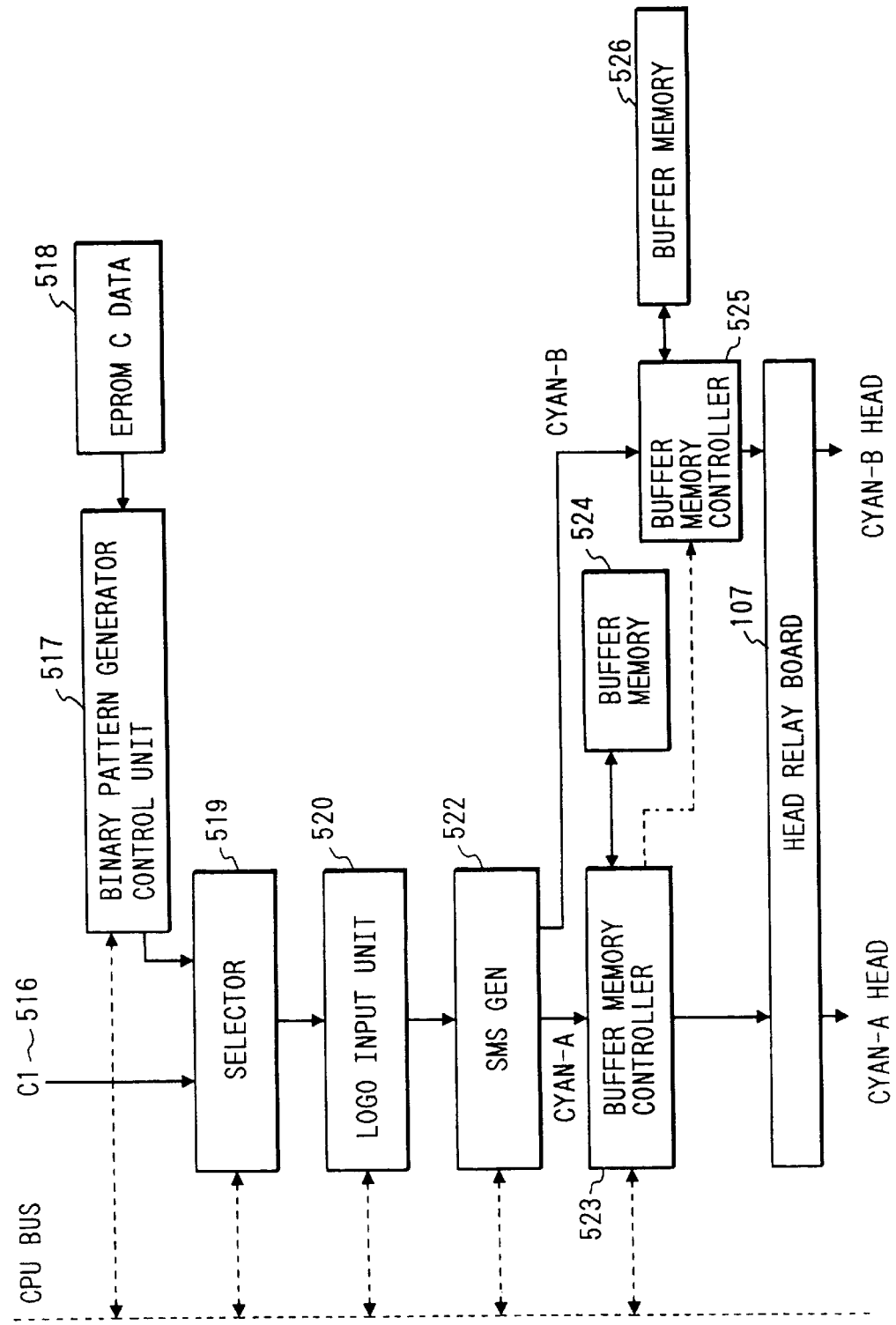

The arrangement of a control system of this apparatus is described below. FIGS. 8 and 9 show the arrangement of the ink jet printer of this embodiment and the arrangement of its operation unit. FIGS. 10 to 12 are block diagrams schematically showing an example of the inner arrangement of a control board 102 in FIG. 8 in accordance with the flow of data.

The host computer H sends printing image data to the control board 102 through an interface (in this case, GPIB). An apparatus for sending the image data is not particularly limited, and the form of transfer may be transfer using a network or off-line transfer using a magnet tape or the like. The control board 102 includes a CPU 102A, a ROM 102B storing various programs, a RAM 102C having various register areas and work areas, and parts shown in FIGS. 10 to 12. The control board 102 with this arrangement controls the entire apparatus. A console unit 103 has an operation unit which is used by an operator to enter necessary commands to the printer P, and a display unit for displaying messages and the like for an operator. A cloth feeder 104 consists of, e.g., a motor and feeds a printing medium, such as cloth, as an object to be printed. A driver unit I/O 105 is for driving various motors (suffixed with "M") and various solenoids (indicated by "SOL") shown in FIG. 9. Relay boards 107 supply drive signals to the individual heads and also receive information (indicating the presence/absence of a head or the color presented by a head) relating to each head and supply the information to the control board 102. This information is transferred to the host computer H as described above.

When information of the image data to be printed is supplied from the host computer H, this image data is stored in an image memory 505 via a GPIB interface 501 and a frame memory controller 504 (see FIG. 10). The image memory of this embodiment has a capacity of 124 Mbytes, in which A1 size is represented by an 8-bit pallet data format. That is, eight bits are assigned to one pixel. A DMA controller 503 increases the speed of memory transfer. When transfer from the host computer H ends, printing can be started after predetermined processing.

In this embodiment, the host computer connected to the printer transfers the image data as a raster image. Since a plurality of ink ejection nozzles are arranged in the longitudinal direction in each printing head, conversion must be so performed that the array of the image data agrees with the printing head. This data conversion is performed by a raster conversion controller 506. The data converted by the raster conversion controller 506 is magnified by a subsequent magnification controller 507 for magnifying the image data and is supplied to a pallet conversion controller 508. Note that the data up to the magnification controller 507 is data supplied from the host computer H and is an 8-bit pallet signal in this embodiment. This pallet data (8 bits) is transferred as common data to processing units (to be described below) for the individual printing heads and processed.

In the following description, it is assumed that the number of printing heads is eight, i.e., there are eight heads for recording yellow, magenta, cyan, black, and other specific colors S1 to S4.

The pallet conversion controller 508 supplies the input pallet data and a conversion table for the corresponding color from the host computer H to a conversion table memory 509.

In the case of an 8-bit pallet, the number of color types that can be reproduced is 256 from 0 to 255. For example, a table as in FIG. 13 is developed for each color in the corresponding table memory 509.

As described above, the number of reproducible color types is 256 from 0 to 255 in the case of an 8-bit pallet. For example, one of the following printings is executed:

If 0 is input printing of light gray
If 1 is input solid printing of specific color 1
If 2 is input solid printing of specific color 2
If 3 is input printing of bluish color as mixed color of cyan and magenta
If 4 is input solid printing of cyan
If 5 is input printing of reddish color as mixed color of magenta and yellow
If 254 is input solid printing of yellow
If 255 is input printing of nothing As a practical circuit configuration, the pallet conversion table memory 509 accomplishes its function by writing conversion data in an address position corresponding to pallet data. That is, if pallet data is actually supplied as an address, the memory is accessed in a readout mode. Note that the pallet conversion controller 508 manages the pallet conversion table memory 509 and interfaces the control board 102 with the pallet conversion table memory 509. Also, a circuit (a circuit for multiplying the output by 0 to 1) for setting the mixing amount of a specific color can be inserted before an HS system in the next stage which is constituted by an HS conversion controller 510 and an HS conversion table memory 511, thereby setting a variable mixing amount for a specific color.

The HS conversion controller 510 and the HS conversion table memory 511 correct unevenness in the print densities corresponding to the orifices of each head on the basis of data measured by a head characteristic measurement device 108 including the density unevenness correction section shown in FIG. 7. For example, for an orifice whose density is low (whose ejection amount is small), data conversion is so performed as to increase the density; for an orifice whose density is high (whose ejection amount is large), data conversion is so performed as to decrease the density; and for an orifice whose density is medium, data conversion is so performed as to keep the density. This processing will be described later.

A γ-conversion controller 512 and a γ-conversion table memory 513 in the subsequent stage perform table conversion for increasing or decreasing the density as a whole. For example, if nothing is to be done, a linear table as follows is used:

0 output for 0 input
100 output for 100 input
210 output for 210 input
255 output for 255 input A binarization controller 514 in the next stage has a pseudo gradation function. That is, the binarization controller 514 receives 8-bit gradation data and outputs binarized 1-bit pseudo gradation data. As a method of converting multi-value data into binary data, a dither matrix method and an error diffusion method are usable. Assume that this embodiment also employs one of these methods, and a detailed description thereof will be omitted. In either case, it is only necessary to represent the gradation by the number of dots per unit area.

The binarized data is stored in a buffer memory 515 and used in driving each printing head. The output binary data from the individual buffer memories are delivered as data C, M, Y, Bk, and S1 to S4. Since these binary signals are subjected to identical processing, the following description will be made by taking the binary data C as an example with reference to FIG. 12. Note that FIG. 12 shows an arrangement for cyan as a print color, and identical arrangements are provided for other colors. Note also that FIG. 12 is a block diagram showing the circuit configuration subsequent to the buffer memory 515 illustrated in FIGS. 10 and 11.

The binarized signal C is delivered to a sequential multi-scan generator (to be referred to as an SMS generator hereinafter) 522. Since, however, test printing of the apparatus is sometimes carried out by pattern generators 517 and 518, the data is first supplied to a selector 519. This switching is of course controlled by the CPU of the control board 102. Therefore, if an operator performs a predetermined operation on the console unit 103 (see FIG. 8), data from the binary pattern generation control unit 517 is selected in order to perform test printing. Normally, therefore, data from the binarization controller 514 (the buffer memory 516) is chosen. A logo input unit 520 is inserted between the selector 519 and the SMS generator 522. That is, a logo mark indicating the brand or the like of a manufacture or a designer is in many cases printed at the edge portions of cloth in textile printing. The logo input unit 520 is used to meet this requirement. The logo input unit 520 can be constituted by, e.g., a memory for storing logo data and a controller for managing the print position or the like. The logo input unit 520 can perform a necessary designation or the like in step MS11 in FIG. 2.

The SMS generator 522 is for preventing density unevenness on an image caused by a change in the ejection amount of each nozzle. Multi-scan is proposed in, e.g., Japanese Patent Application No. 4-79858 (refiled as Japanese Patent Application No. 4-139176, now Japanese Laid-Open Patent Application No. 5-330083). It is possible in step MS21 in FIG. 2 to designate whether the image quality is to be given priority by performing multi-scan, i.e., by ejecting an ink from a plurality of orifices for one pixel, or the speed is to be given priority without performing multi-scan. Printing schemes controlled by this SMS generator 522 are described later.

A buffer memory 524 is for correcting the physical position of each head, i.e., the positional relationship between the upper and lower printing units in FIG. 5 or the position of each head with respect to other heads. The buffer memory 524 temporarily stores image data and outputs the data at a timing corresponding to the physical position of a head. Therefore, the capacity of the buffer memory 524 varies from one print color to another.

After the above data processing, the data is supplied to the head via the head relay board 107.

In conventional apparatuses, permanent data for pallet conversion and γ-conversion are stored in a memory provided in the apparatus main body. For this reason, the data is in some cases not in agreement with image data which is desired to be output, with the result that no image having satisfactory image quality can be obtained. In this embodiment, therefore, these conversion data can be externally applied and stored in the individual conversion table memories. As an example, the pallet conversion data as in FIG. 13 is down-loaded in the conversion table memory 509. That is, all of the conversion table memories 509, 511, and 513 of this embodiment are constituted by RAMs, and the data for pallet conversion and γ-conversion are supplied from the host computer H. The data for HS conversion is input from the head characteristic measurement device 108 including the arrangement in FIG. 7, so data meeting the state of each head can be obtained constantly. To allow the head characteristic measurement device 108 to attain the head characteristics for each print color, test printing (printing at a predetermined uniform halftone density) is performed by using each printing head. The state of each head is obtained by measuring the density distribution corresponding to the resulting print width. The state of a head means a variation in the ejection states of a plurality of nozzles included in the head, or a difference of the density of an image printed by the head from a desired density.

In this embodiment, in order to prevent an abnormal output, the output is kept 0 so as not to perform printing, as in FIG. 14, even if input data is present, until parameters for conversion are input. This similarly applies to the γ-conversion and the like.

(3. 3) Explanation of printing schemes

Figure 15:
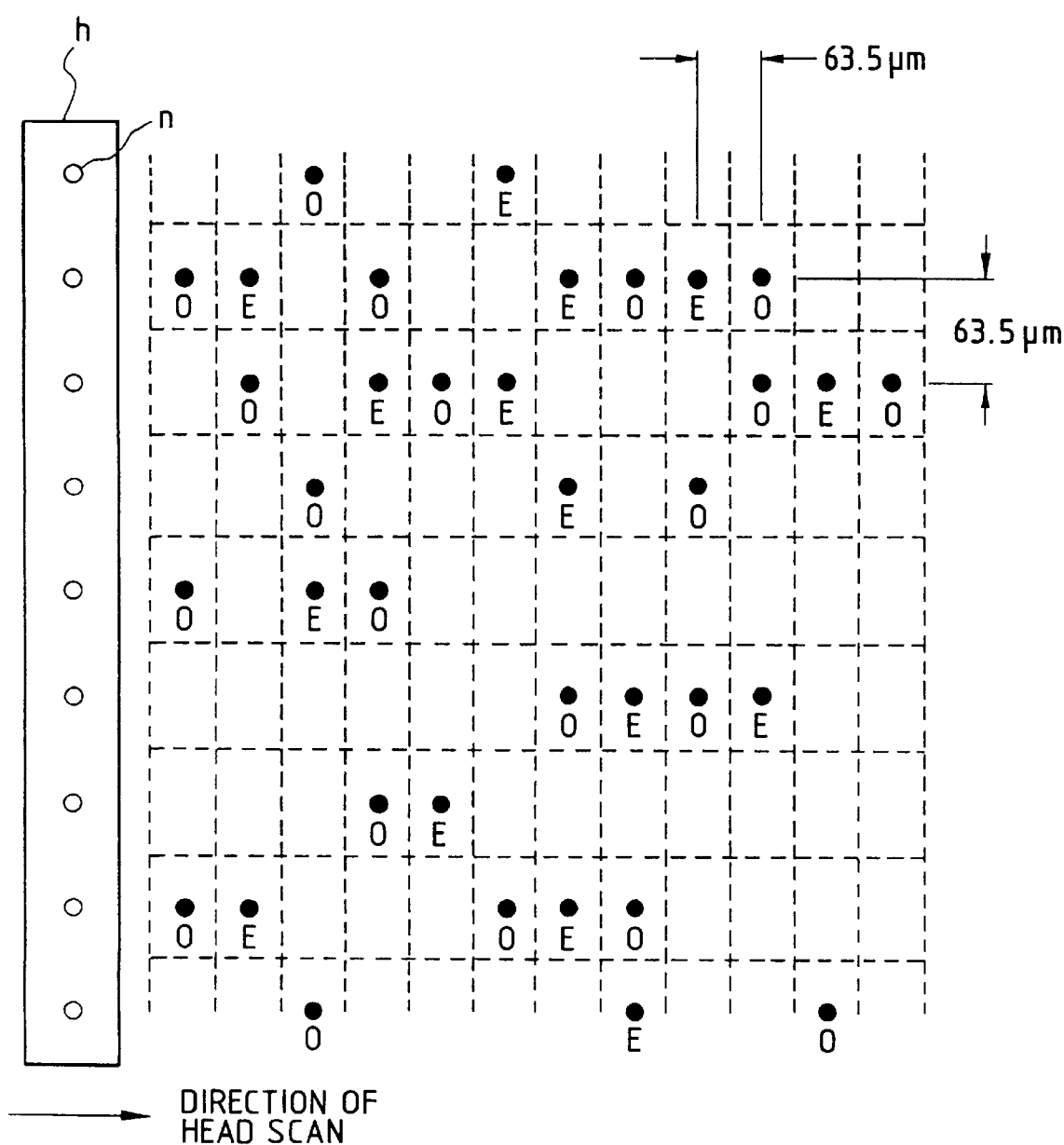
FIG. 15 is a view for explaining formation of pixels performed for an image to be printed.
Figure 16:
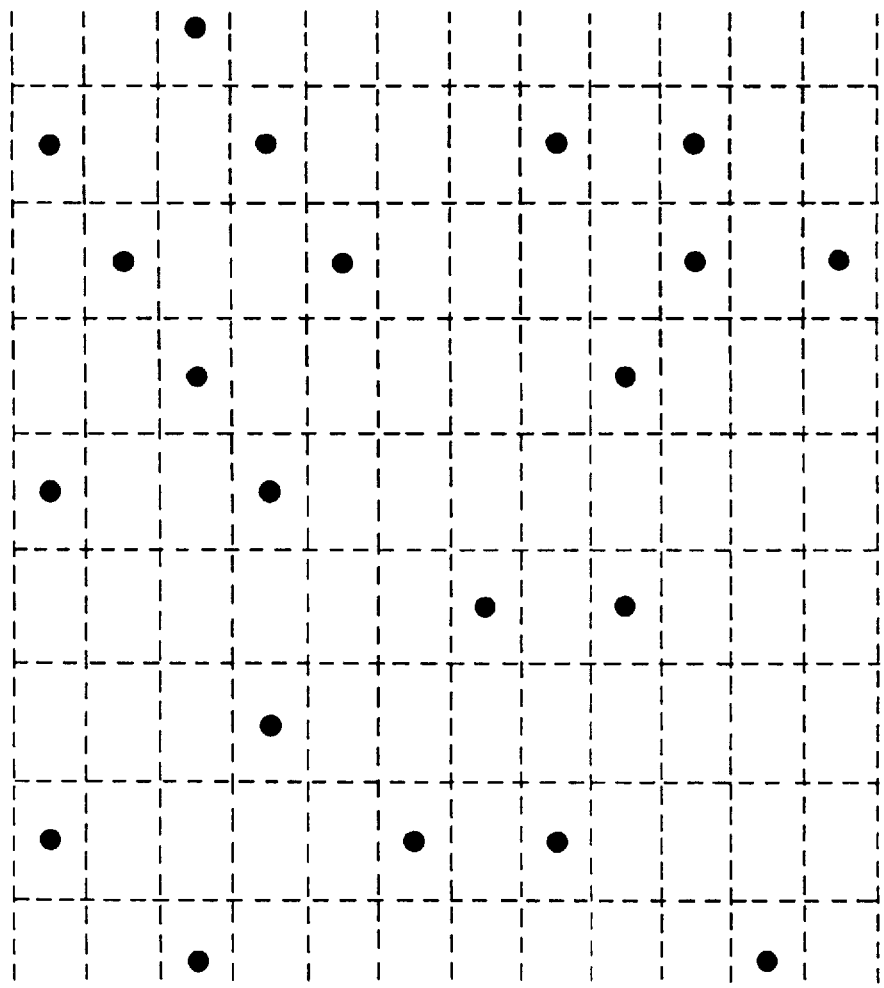
FIGS. 16 and 17 are views for explaining data thinning for the image in FIG. 15.
Figure 17:
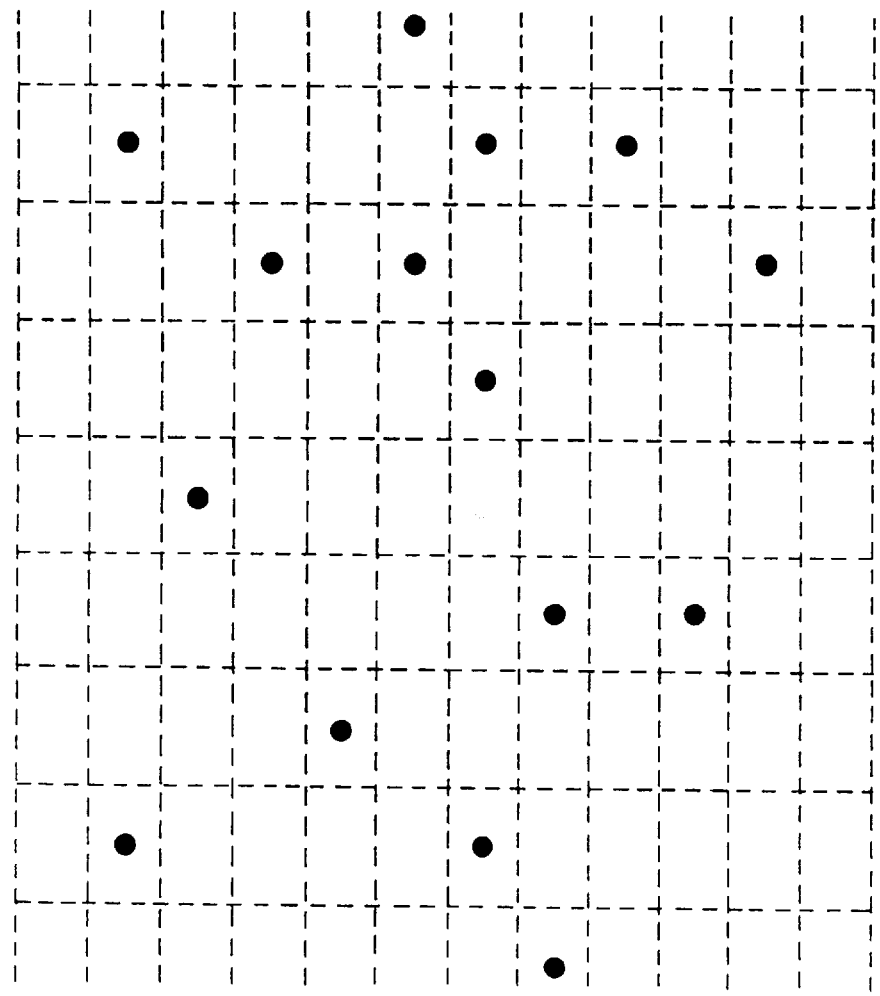

FIG. 15 shows certain print data, in which each rectangular area enclosed by dotted lines corresponds to one pixel and has an area of about 63.5 $\mu m^2$ in the case of 400 DPI. In FIG. 15, each area having a full circle indicates a pixel at which an image is to be printed. The printing as in FIG. 15 is performed by moving a printing head h in the direction indicated by an arrow and ejecting an ink from ink orifices n at predetermined timings. Referring to FIG. 15, reference symbol O indicates odd-numbered print data in the head scan direction; and E, even-numbered print data.

The sequential multi-scan is a method of printing one line in the head scan direction by using a plurality of orifices in order to correct variations in the size of ink droplets ejected from the individual orifices, or variations in the density between the orifices caused by variations in the direction of ink ejection. By forming one line using a plurality of orifices, variations can be reduced by use of the random nature of the ejection characteristics. The sequential multi-scan carried out by performing scanning twice can be done by using the heads of the first printing unit 11 illustrated in the lower portion of FIG. 4 and the heads of the second printing unit 11' in the upper portion thereof. It is also possible to use the upper half of each head in the first scan and the lower half in the second scan. Consequently, it is possible to print the odd-numbered print data (FIG. 16) in the head scan direction by using the orifices in the upper half and the even-numbered print data (FIG. 17) by the lower-half orifices. This prevents degradation in the print quality derived from variations in the ink ejection states of the orifices of each ink jet head. The result is an effect of reducing density unevenness, which is comparable to the effect of head shading.

FIGS. 18 to 21 show several different printing schemes selectable in this embodiment.

Figure 18:
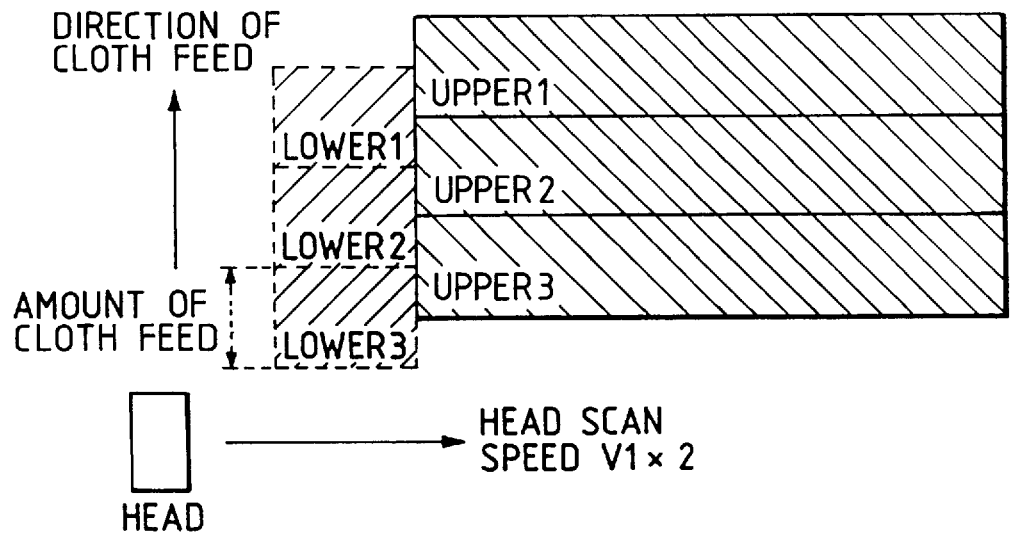
FIGS. 18 to 21 are views for explaining examples of the printing scheme performed by the printer in FIG. 4.

FIG. 18 shows printing by regular two-time multi-scan (involving thinning) using the heads of the first and second printing units illustrated in FIG. 5. Referring to FIG. 18, areas printed in the first, second, and third times by the lower heads of the first printing unit 11 in FIG. 5 are indicated by "LOWER 1", "LOWER 2", and "LOWER 3", respectively, and areas printed in the first, second, and third times by the upper heads of the second printing unit 11' are indicated by "UPPER 1", "UPPER 2", and "UPPER 3", respectively.

The direction of cloth feed is as indicated by an arrow in FIG. 18, and the step amount of cloth feed for one-time printing equals the head width. As can be seen from FIG. 18, each area is formed by the upper halves of the upper heads and the lower halves of the lower heads, or by the lower halves of the upper heads and the upper halves of the lower heads. Data printed by each group of the heads is thinned, so a predetermined density is obtained by overlapping the data printed by both the groups of heads. In this case, the head scan speed is V1×2.

Figure 19:
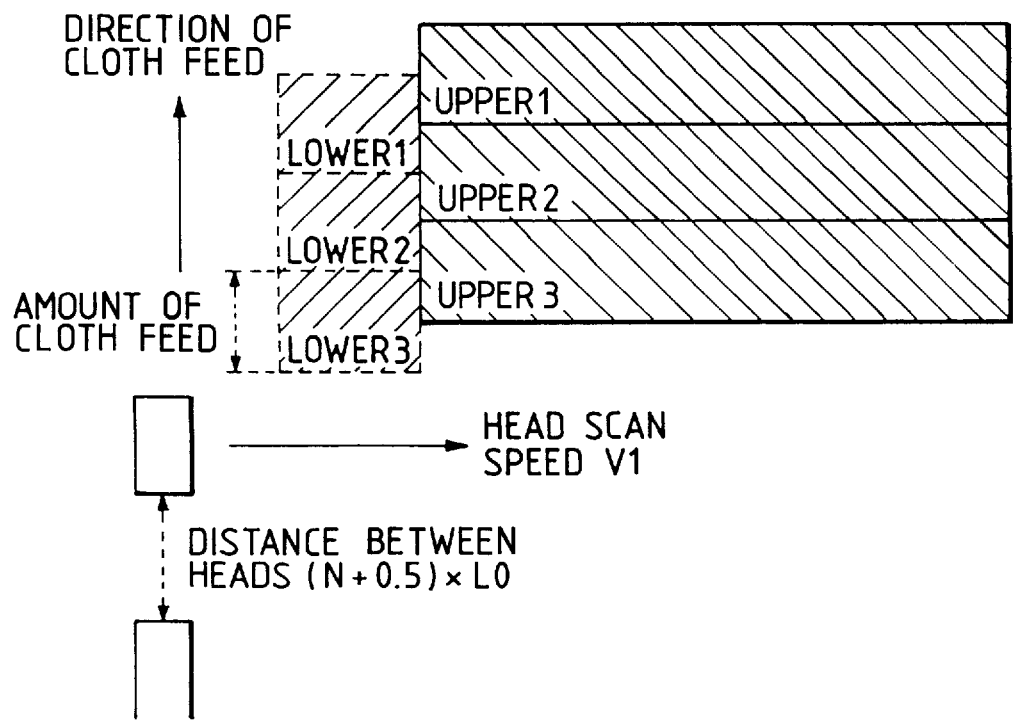

FIG. 19 shows printing in which the print density is doubled compared to that in FIG. 18. The difference of this printing from that in FIG. 18 is that print data is not thinned and the carriage speed is reduced to ½. The SMS generator 522 shown in FIG. 12 executes data allocation in the printing in FIG. 18. However, this is not executed in the printing in FIG. 19. The speed is lowered to ½ in order to meet the ink refill frequency of the head.

Figure 20:
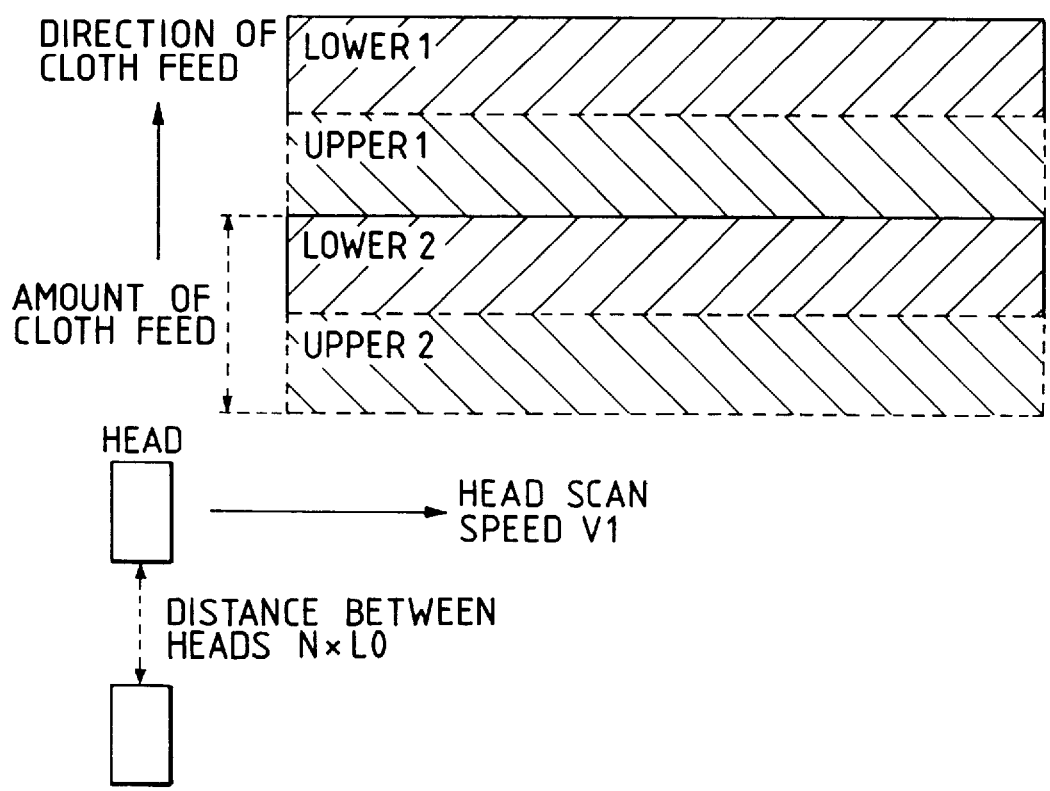

FIG. 20 illustrates printing in which no thinning is performed and the amount of cloth feed is doubled as compared with that in FIG. 18. In addition, the distance between the upper and lower heads is changed to an integral multiple of a head width L0. Therefore, it is possible to provide a means for varying the distance between the first and second printing units 11 and 11' in FIG. 4. In the printing as in FIG. 20, however, it is also possible to adjust the amount of cloth feed and the scan timings of the upper and lower heads even if the head distance is "(N+0.5)×L0" as in FIGS. 18 and 19.

Figure 21:
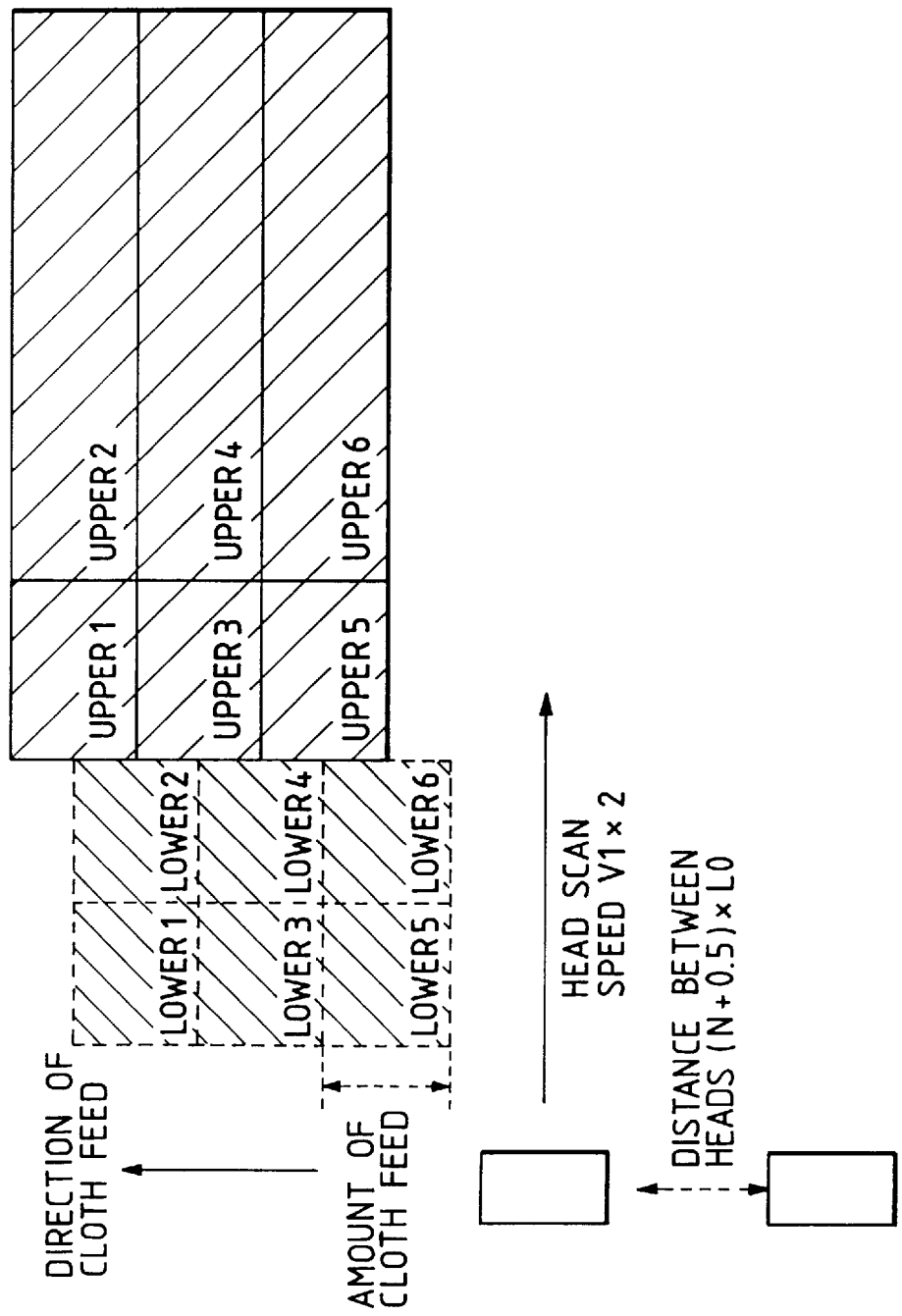

FIG. 21 shows still another printing scheme. In FIG. 18, printing is performed by scanning each of the upper and lower heads once, i.e., twice in total. In FIG. 21, printing is performed by scanning each of the upper and lower heads twice, i.e., four times in total. This scheme has the advantage of being able to simplify the design since it is not necessary to set a thinning mode and a non-thinning mode by using the SMS generator 522, and the speed of the scanner need not be switched.

(3. 4) Explanation of head shading

An image signal read from a test pattern (to be described later) is supplied to an image formation unit and used in correction of the driving conditions of the printing heads as will be described later.

In the present invention, the adjustment for preventing density unevenness from taking place during image formation involves at least one of the following: uniformizing the image densities of droplets ejected from a plurality of liquid orifices of the printing heads by using the printing heads themselves; uniformizing the image densities of a plurality of heads; and performing uniformization in order to obtain either a desired color or a desired density by mixing a plurality of liquids. The adjustment preferably involves more than one of these.

As a density uniformization correcting means for this purpose, it is preferable to automatically determine the correction conditions by automatically reading a reference print by which the correction conditions are given. It is also possible to additionally use a manual adjusting device for performing fine adjustment or user adjustment.

The object of correction obtained by the correction conditions may be any of optimum printing conditions, adjustment within a predetermined range including an allowable range, and a reference density which changes in accordance with a desired image. That is, all factors included in the gist of the correction are applicable.

As an example, density unevenness correction for a multi-head having a printing element number N is described below. In this correction, the print outputs of individual elements are controlled to converge to an average density value as the object of the correction.

Assume that a density distribution takes place when printing is performed by driving elements (1 to N) with a certain uniform image signal S.

First, densities $OD_1$ to $OD_N$ in portions corresponding to the individual printing elements are measured to obtain:
Average density as correction object, $$\overline{OD} = \sum_{n=1}^{N} OD_n/N$$

This average density need not be calculated by averaging the densities of the individual elements. For example, it is possible to use a method of calculating an average value by integrating the quantity of reflected light, or some other well-known method.

Figure 22A:
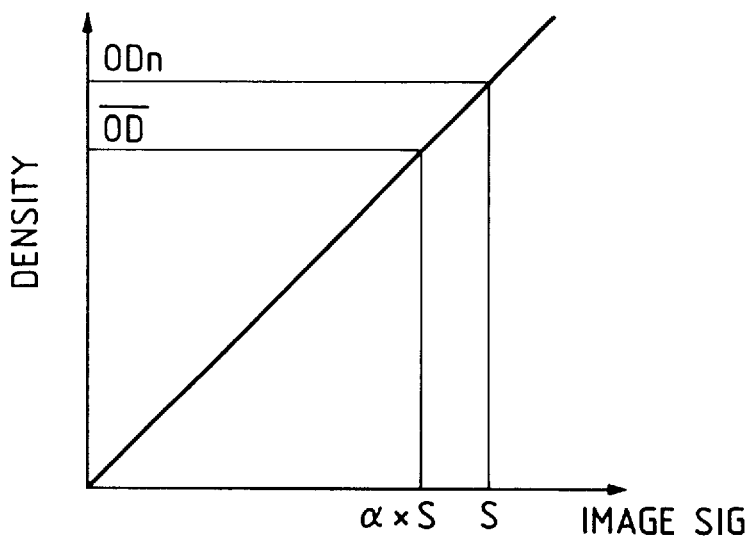
FIGS. 22A and 22B are graphs for explaining how to correct unevenness in the printing head.

If the relationship between the value of a multi-value image signal and the output density of a certain element or a certain group of elements is as shown in FIG. 22A, a signal to be actually given to this element or this group of elements can be obtained by determining a correction coefficient $\alpha$, by which the objective density $\overline{OD}$ is given, by correcting the signal S. That is, it is only necessary to give to this element or this group of elements a correction signal $\alpha \times S$, which is obtained by correcting the input signal S into $\alpha \times S = (\overline{OD}/OD_n) \times S$, in accordance with the signal S. More specifically, this is done by performing table conversion as in FIG. 22B for the input image signal.

Figure 22B:
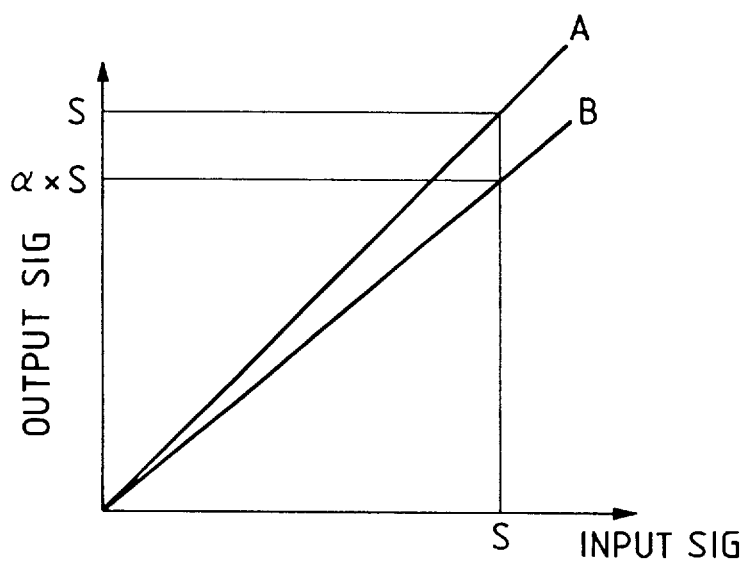

In FIG. 22B, a straight line A has a slope of 1.0 and represents a table by which an input signal is delivered intact without being converted, whereas a straight line B has the slope $\alpha = \overline{OD}/OD_n$ and represents a table by which an output signal is converted into $\alpha \cdot S$ with respect to the input signal S. Therefore, for an image signal corresponding to the nth printing element, table conversion is performed such that a correction coefficient $\alpha_n$ is determined for each table as represented by the straight line B in FIG. 22B, and then the heads are driven. Consequently, the densities in portions printed by the N printing elements become equal to the $\overline{OD}$. By performing this processing for all of the printing elements, density unevenness is corrected to realize a uniform image. That is, variations can be corrected by obtaining beforehand data indicating which table conversion is to be executed for an image signal corresponding to which printing element.

This objective correction can also be performed as approximate uniformization processing by comparing the densities of nozzles (in units of 3 to 5 nozzles).

Density unevenness can be corrected by the method as discussed above. However, it is also expected that density unevenness may occur depending on the use state of the apparatus or on the environmental change, or due to a change in density unevenness itself before correction or to a change with time of the correction circuit. To deal with such events, the correction amount for an input signal must be updated. The cause of this density unevenness can be considered that, in the case of an ink jet printing head, a precipitate from an ink or an external foreign matter adheres in the vicinity of an ink orifice with use, resulting in a change in the density distribution. This is also predicted from the fact that the density distribution sometimes changes in a thermal head due to degradation or modification of individual heaters. In such instances, density unevenness correction cannot be satisfactorily performed with an input correction amount initially set in the manufacture. Therefore, the inconvenience that the density unevenness becomes more and more conspicuous with use is also a problem to be solved during extended periods of use.

Figure 23:
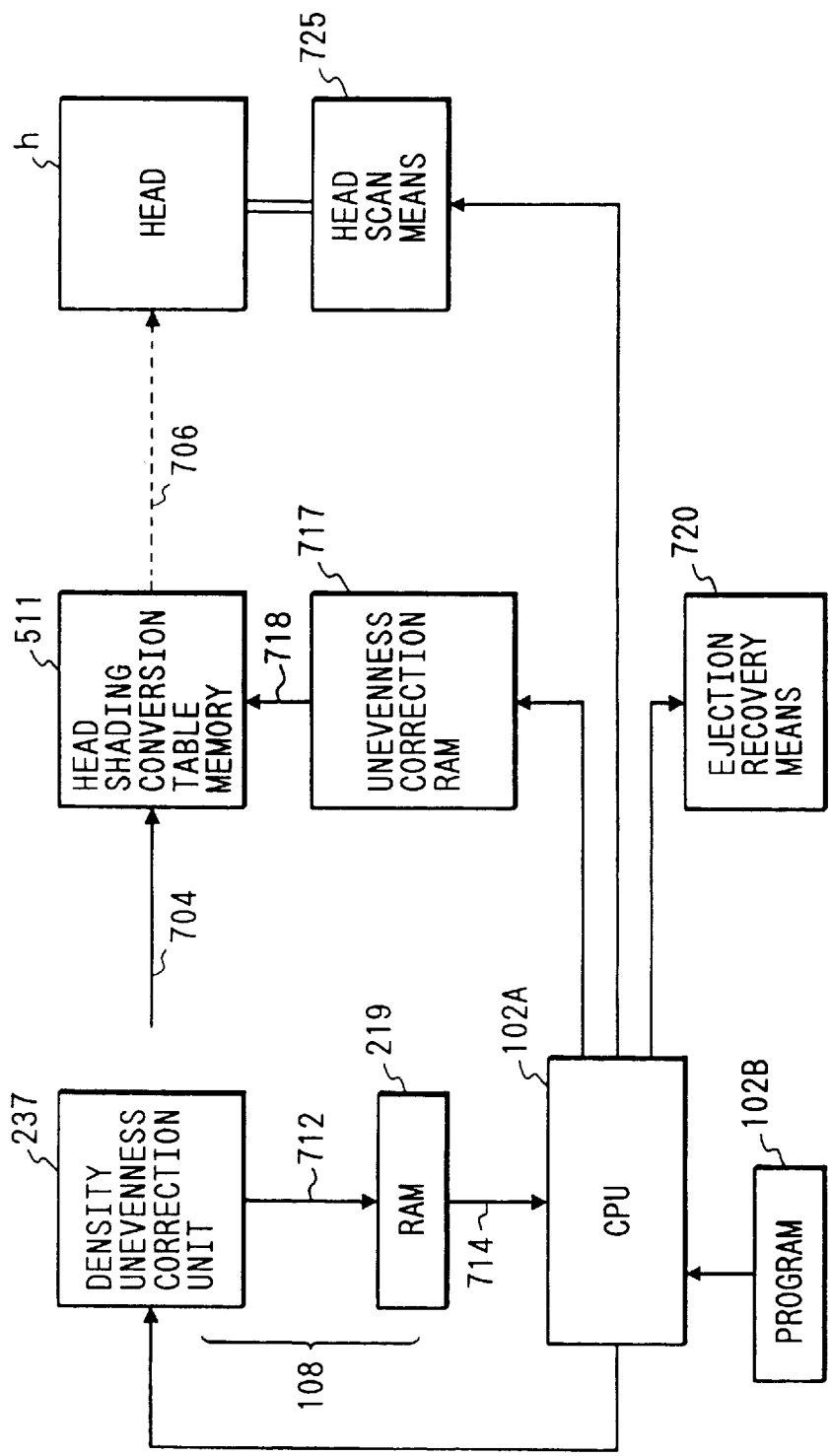
FIG. 23 is a block diagram showing an example of the arrangement of a control system according to the embodiment.

FIG. 23 shows a practical example of a control system of the apparatus of this embodiment, particularly a head shading (HS) system. In FIG. 23, a printing head h represents the heads of the first and second printing units illustrated in FIG. 5.

An unevenness correction signal 718 is supplied from an unevenness correction RAM 717. An ejection recovery means 720 recovers a good ejection state of the printing head h by performing, e.g., suction. A head scan means 725 scans the printing head with respect to a printing medium or a test pattern printing medium.

As discussed earlier with reference to FIG. 11, a signal 704 which is pallet-converted by the pallet conversion units (508, 509) is so converted as to correct the unevenness of the printing head by each HS conversion table memory 511. This unevenness correction table has 64 correction straight lines. These correction straight lines (which can also be nonlinear curves) are switched in accordance with the unevenness correction signal (a select signal for the correction straight lines) 718.

Figure 24:
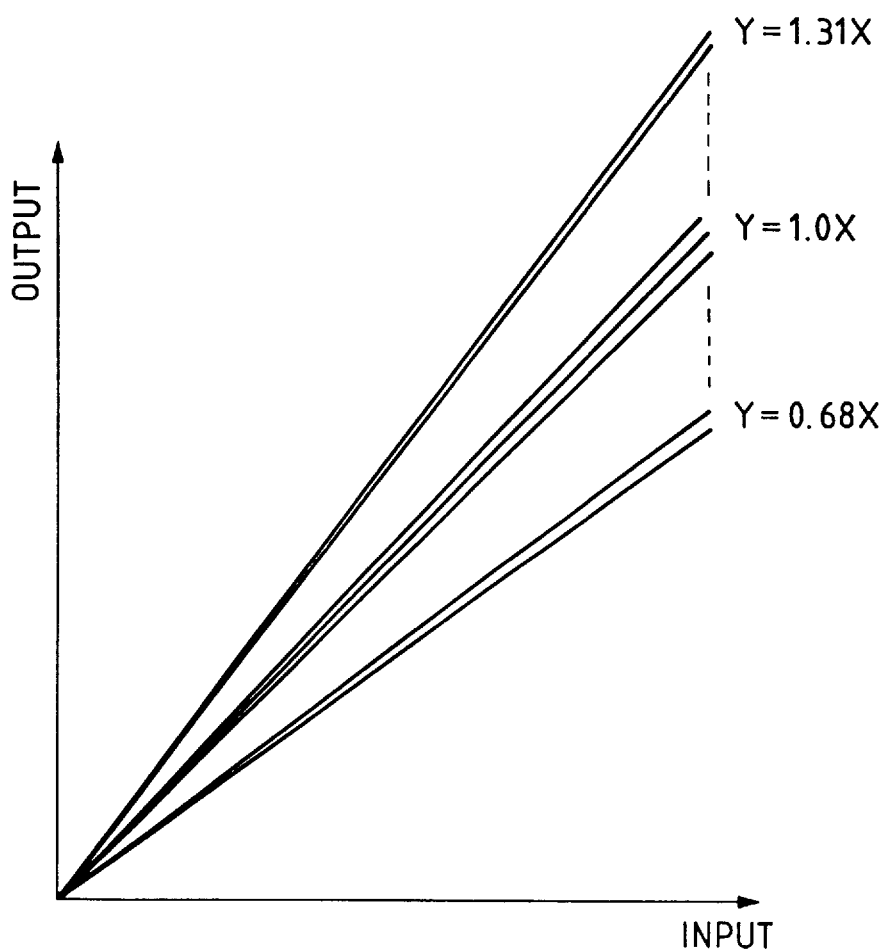
FIG. 24 is a graph for explaining an unevenness correction table used in the embodiment.

FIG. 24 shows an example of the unevenness correction table. In this example, the table has 64 straight lines which differ in slope by 0.01 from Y=0.68X to Y=1.31X. These correction straight lines are switched in accordance with the unevenness correction signal 718. For example, a correction straight line with a small slope is selected when a signal for a pixel to be printed by an orifice with a large dot diameter is applied. Conversely, if an orifice with a small dot diameter is to be used, a correction straight line with a large slope is chosen. In this manner, an image signal is corrected.

The unevenness correction RAM 717 stores select signals for correcting straight lines required to correct the unevenness of the individual printing heads. That is, the RAM 717 stores unevenness correction signals having 64 values from 0 to 63 in a number equal to the number of orifices, and outputs the unevenness correction signal 718 in synchronism with an input image signal. A signal 706 whose unevenness is corrected by the straight line selected by this unevenness correction signal is subjected to γ-conversion as mentioned earlier with reference to FIG. 11.

Upon execution of the above unevenness correction, the binarization controller 514 performs binarization on the basis of the corrected multi-value image signal, and subsequently the heads are driven. Consequently, the density unevenness of the printing heads is corrected, yielding a uniform image. However, if the density unevenness pattern of the heads changes with use, the unevenness correction signal that has been used becomes inadequate, and as a result unevenness occurs on images. In such cases, the unevenness correction data is rewritten.

Note that, as another head driving method, it is also possible to use a method in which the driving energy (e.g., the driving duty) for an ejection energy generating element corresponding to an orifice of a head whose density is high is decreased, while the driving energy for an ejection energy generating element corresponding to an orifice whose density is low is increased.

The relationship of the HS conversion controller 510 and the conversion table memory 511 in FIG. 11 with the arrangement in FIG. 23 is as follows. That is, in this embodiment, the HS conversion table memory 509 can be a ROM storing the individual correction curves as in FIG. 24 in the form of tables, and the unevenness correction RAM 717 can be a constituent element of the HS conversion controller 510.

It is also possible to constitute the HS conversion table memory 509 by a rewritable memory, such as a RAM, such that tables stored in an additionally provided ROM or the like are selectively read out in accordance with calculations of HS data (density unevenness correction data) and developed in the HS conversion table memory 509. In this case, as will be described later, if independent density unevenness correction data are to be used for the upper and lower heads, the capacity of the memory 509 is so set as to correspond to separate HS corrections for the upper and lower heads. In addition, prior to performing the separate HS corrections for the upper and lower heads, the corresponding tables can be rewritten.

Figure 25:
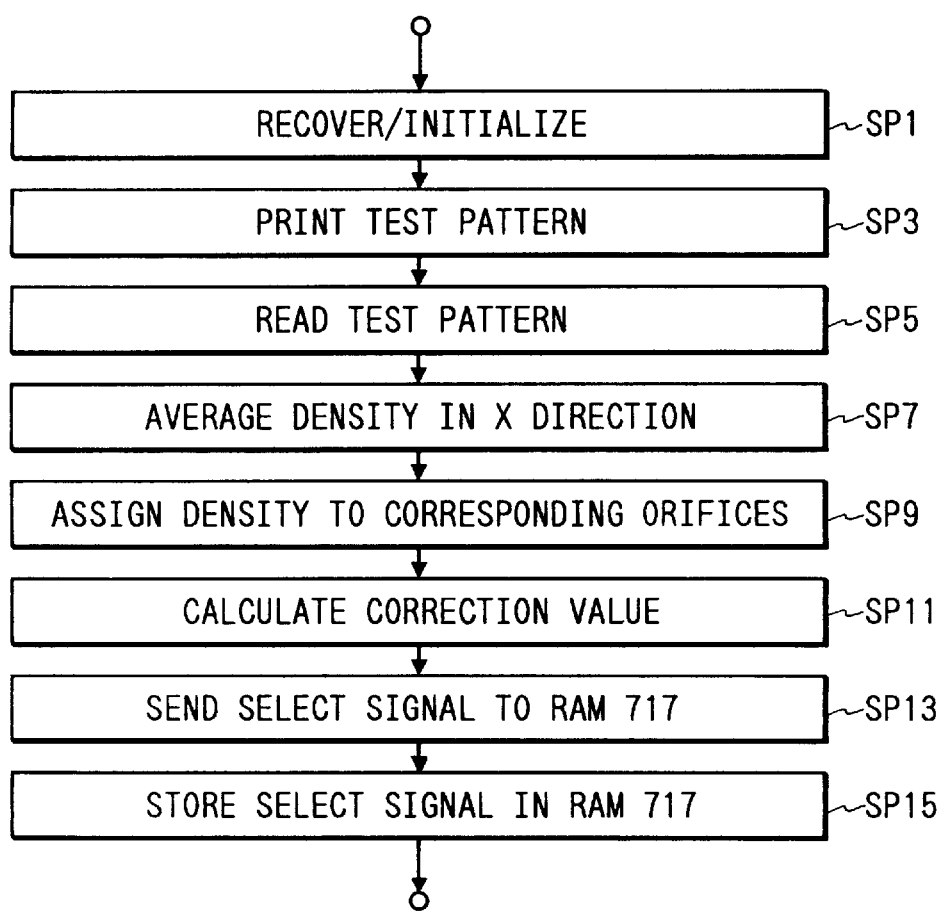
FIG. 25 is a flow chart showing an example of the unevenness correction procedure according to the embodiment.

FIG. 25 shows an example of the unevenness correction procedure according to this embodiment.

When this procedure is started, ejection stabilization is first executed in step SP1 by performing head recovery/initialization. This is done because, if the density unevenness correction is performed while the printing heads have no normal ejection characteristics due to an increased viscosity of an ink or mixing of dust or air bubbles, it may become impossible to recognize true head characteristics (density unevenness).

In the ejection stabilization processing, it is possible to forcibly discharge the ink from orifices by engaging the printing head h with a cap as a constituent element of the ejection recovery means 720 and performing suction through this cap. It is also possible to clean the surface on which orifices are formed by bringing an ink absorbing body, which can be disposed in the cap unit, into contact with this orifice formation surface, or by blowing of air or wiping. Additionally, preliminary ejection also can be performed by driving the printing head in the same way as in regular printing. Note that the driving energy in the preliminary ejection is not necessarily identical with that in the printing. That is, it is only necessary to execute processing analogous to a so-called ejection recovery operation performed in ink jet printers.

Instead of or after the above processing, a pattern for the ejection stabilization can be printed on the test pattern printing medium 213. Thereafter, a test pattern or the like for density unevenness correction can be printed.

Subsequently, printing and reading of the test pattern are performed in steps SP3 and SP5, respectively. The manners of printing and reading carried out in this embodiment are described below.

Figure 26:
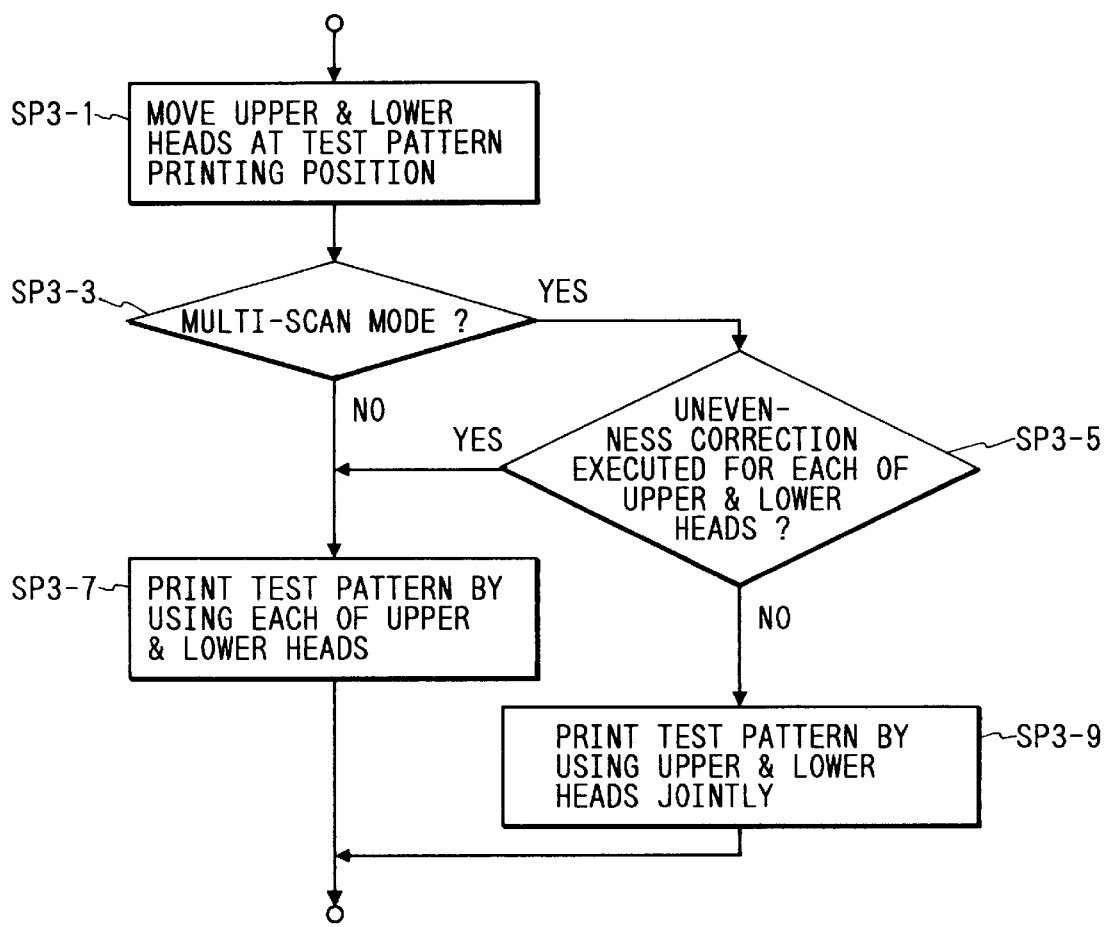
FIG. 26 is a flow chart showing details of test image formation processing in FIG. 25.

FIG. 26 shows an example of the test image printing procedure (step SP3). In this procedure, the carriages of the first and second printing units 11 and 11' are first moved to the test pattern (test image) printing position, FIG. 7, in step SP3-1. Subsequently, in step SP3-3, it is checked whether the multi-scan mode as in FIGS. 18, 19, and 21 or the high-speed mode as in FIG. 20 is set. If the multi-scan mode is set, it is checked in step SP3-5 whether unevenness correction data is to be determined for each of the upper and lower heads.

Figure 27:
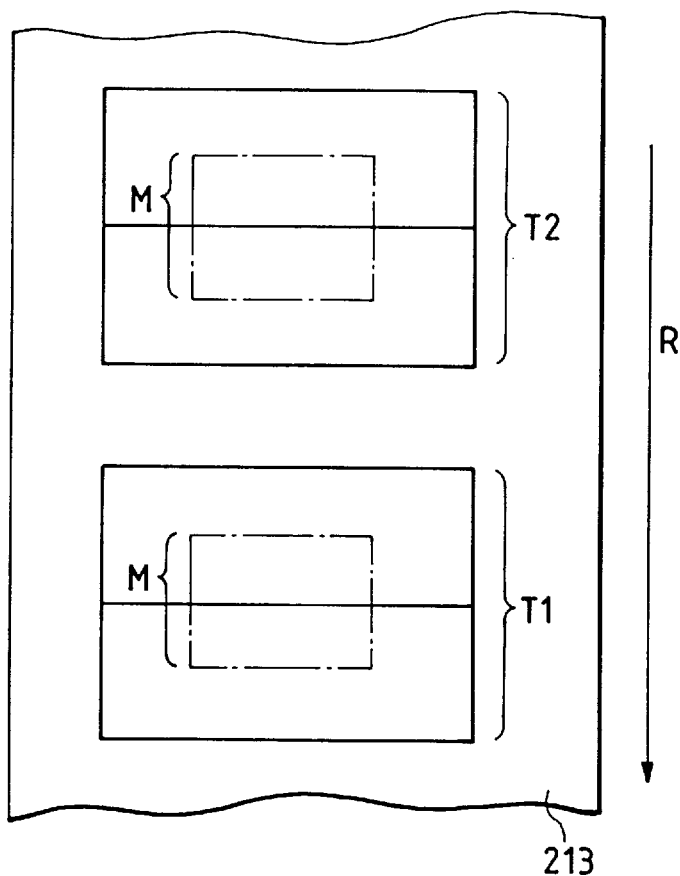
FIG. 27 is a view for explaining an example of a test image used to separately perform HS conversion for two heads.

If it is determined in step SP3-3 that the high-speed mode is set or if YES is determined in step SP3-5, the flow advances to step SP3-7. In step SP3-7, test patterns T1 and T2, such as shown in FIG. 27, are formed by scanning the lower and upper heads twice, and read in a direction R. In this case, in each of the subsequent test patterns, it is only necessary for a predetermined area M from the center to the center of each scan to be an object of unevenness correction calculations. This makes it possible to cover processing for all of the orifices of the upper and lower heads, and to eliminate instability in the read density at the end portion of an image, which may take place when reading is performed by performing printing by only one scan. To this end, so-called irregular 3-line printing also can be performed as disclosed in Japanese Patent Application No. 2-329746, in which scan is performed by using several orifices of lower and upper heads before and after scan is performed once by driving all orifices.

Figure 28:
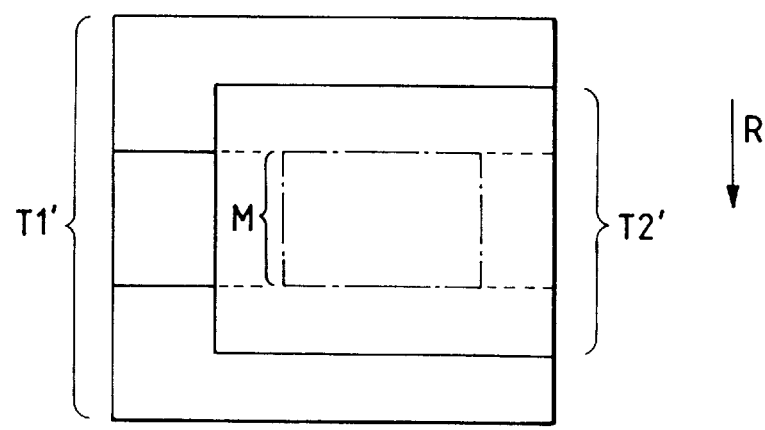
FIG. 28 is a view for explaining an example of a test image used to perform common HS conversion for two heads.

On the other hand, if NO is determined in step SP3-5, the flow advances to step SP3-9 to cause the upper and lower heads to print a test pattern as in FIG. 28. Referring to FIG. 28, an area T' corresponds to a portion printed by scanning the lower head three times, an area T2' corresponds to a portion printed overlapping each other by scanning the upper head twice, and an area M' is an object of the unevenness correction calculations.

Referring back to FIG. 25, in steps SP7 and SP9, averaging of densities in the X direction and assignment of densities to corresponding orifices are performed, respectively. The following can be adopted as the method of assigning the density data obtained in this fashion to the orifices of the heads. First, for a density distribution as a whole, a threshold value by which it is possible to clearly distinguish between a portion in which printing has been performed and a blank portion is determined. Subsequently, a central value of coordinates having densities higher than the threshold value is calculated. Data of the 64 orifices before and after the central value is then obtained as an object of the unevenness correction calculations. In FIG. 27, the first-half data is taken as density data for the lower orifices (from the 65th to the 128th orifices), and the second-half data is taken as density data for the upper orifices (from the 1st to the 64th orifices). In FIG. 28, on the other hand, the first-half data is taken as density data for the upper orifices, in the case of the lower head, and as density data for the lower orifices, in the case of the upper head. Likewise, the second-half data is taken as density data for the lower orifices, in the case of the lower head, and as density data for the upper orifices, in the case of the upper head.

On the basis of the above data, the unevenness correction calculations are performed in step SP11 of FIG. 25. That is, signals in a number equal to the number of orifices are sampled from signals obtained by reading the density unevenness and used as the data corresponding to the individual orifices as discussed above. Assuming these data are $R_1, R_2, \ldots, R_N$ (N=128), they are temporarily stored in the RAM 219, and the CPU 102A executes calculations as follows.

First, these data are converted into density signals by performing the following calculation:

$$C_n = -\log(R_n/R_0)$$

($R_0$ is a constant by which $R_0 \geq R_n$; $1 \leq n \leq N$)
Subsequently,
average density $$\overline{C} = \sum_{n=1}^{N} C_n/N$$

is calculated.

Thereafter, the degrees of the differences of the densities corresponding to the individual orifices from the average density are calculated as follows.

$$\Delta C_n = \overline{C}/C_n$$

Subsequently, a signal correction amount $(\Delta S)_n$ corresponding to $(\Delta C)_n$ is calculated by:

$$\Delta S_n = A \times \Delta C_n$$

where A is a coefficient determined by the gradation characteristics of a head.

Figure 29A:
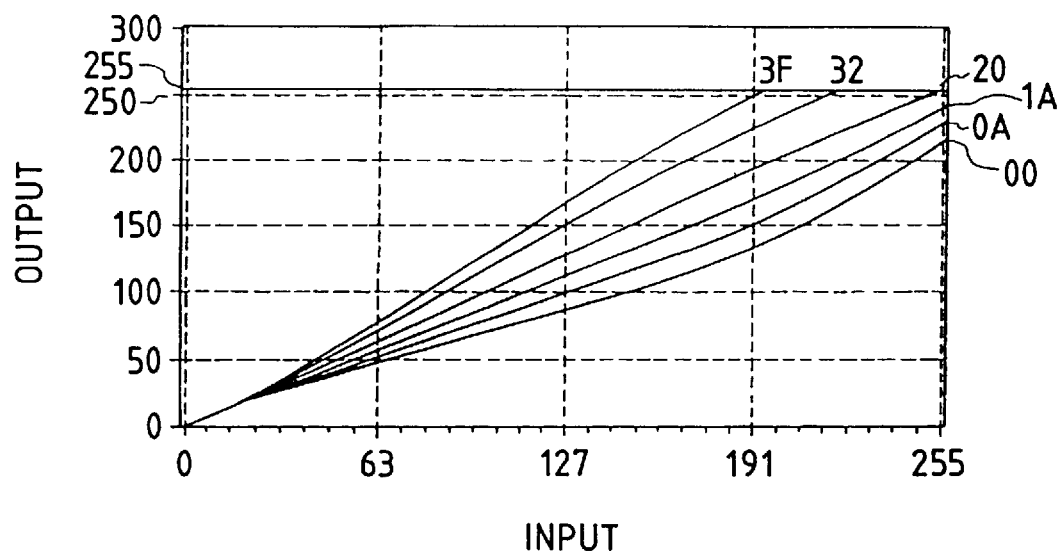
FIGS. 29A and 29B are graphs for explaining two examples of correction curves to be used in HS-$\gamma$ conversion.
Figure 29B:
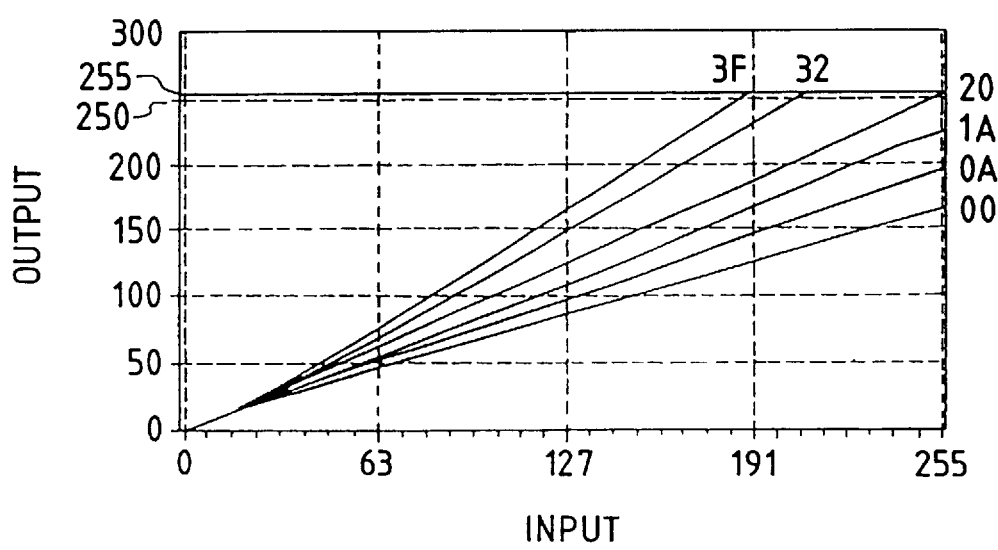

Subsequently, select signals for correction straight lines to be selected in accordance with $\Delta S_n$ are obtained, and unevenness correction signals having 64 values from "0" to "63" are stored in a number equal to the number of orifices in the unevenness correction RAM 717 (steps SP13 and SP15). On the basis of the unevenness correction data thus produced, different γ-correction curves as shown in FIGS. 29A and 29B (nonlinear in FIG. 29A, and linear in FIG. 29B) are selected for the individual orifices, thereby correcting the density unevenness.

Note that in the case illustrated in FIG. 27, the HS conversion data is obtained independently for each of the upper and lower heads. This can be done by setting the capacity of the RAM 717 or of the HS conversion table memory 509 to correspond to the two heads for each color. If the processing speed of the CPU 102A or the like is high, the stored contents can also be rewritten for the upper and lower heads.

In the case shown in FIG. 28, mixed density data is obtained when overlap printing is performed by using the upper orifices of the lower head and the lower orifices of the upper head, and another mixed density data is obtained when overlap printing is performed by using the lower orifices of the lower head and the upper orifices of the upper head. To determine the density unevenness correction data for the individual orifices of the upper and lower heads from these mixed density data, it is also possible to calculate the half value (average value) of the mixed density data and attain the density unevenness correction data for the orifices from the half value, since overlap printing is performed using both the upper and lower heads in actual printing. In addition, even if test patterns as in FIG. 27 are to be used, the density data obtained from the two patterns can be added first and then averaged. Furthermore, it is also possible, if necessary, e.g., if the characteristics of the upper and lower heads are different, to weight the average value of the mixed density data or to divide the mixed density data at an appropriate ratio and assign the divided data to the upper and lower heads.

The above processing can be either performed once for each printing head of one color or repeatedly executed a plurality of number of times until desired correction is effected. The processing can also be performed for color-mixed test patterns as well as for a test pattern of one color.

Furthermore, test patterns can be changed in accordance with the print duties. That is, if it is desirable to perform appropriate correction in several different density areas, it is possible to print test patterns at print duties by which these densities can be obtained and use the results of reading these test patterns (e.g., each of 20%, 40%, 60%, and 80% can be used, or they can be averaged after printing is performed at individual duties).

Also, formation and correction of test patterns can be performed either only when a printing medium is a predetermined one, or regardless of the type of medium. In this case, a test pattern at a proper duty corresponding to the type of a printing medium is formed, read, and corrected, and at the same time the threshold value is altered in accordance with the type of the printing medium.

Moreover, in step MS23 in FIG. 2, a timing at which this procedure is executed can be determined in accordance with various printing conditions.

In the above embodiment of the present invention, if one pixel is constituted by a plurality of dots at least in performing density check printing, e.g., printing of test patterns, the print duty, i.e., the printing can be set by altering the number of print dots within the number of dots constituting one pixel.

The above print ratio, however, can also be set by changing the drive voltage and/or the drive pulse width or by changing the ink injection number per dot. These alterations can meet the case in which one pixel is constituted by one dot. That is, the present invention is naturally applicable to any system regardless of a parameter by which the print ratio is set.

The above embodiment of the present invention is an optimum embodiment in which the correction is performed for each of the ejection energy generating elements. From a practical viewpoint, however, it is more preferable to give a common correction to a predetermined number of adjacent ejection energy generating elements, when the converged state or the processing time of the density uniformization processing are taken into consideration. An optimum arrangement from this point of view is one in which a common correction is given to a large number of ejection energy generating elements of a printing head in units of block driving groups each including a plurality of elements. This block driving itself can be either a well-known block driving scheme or a specific block driving scheme. The block driving, however, must be based on the assumption that it is possible to give driving conditions under which the uniformized density that is corrected by the density unevenness determination by the present invention can be effectuated.

Figures 31A, 31B, 31C, 31D, 31E, 31F:
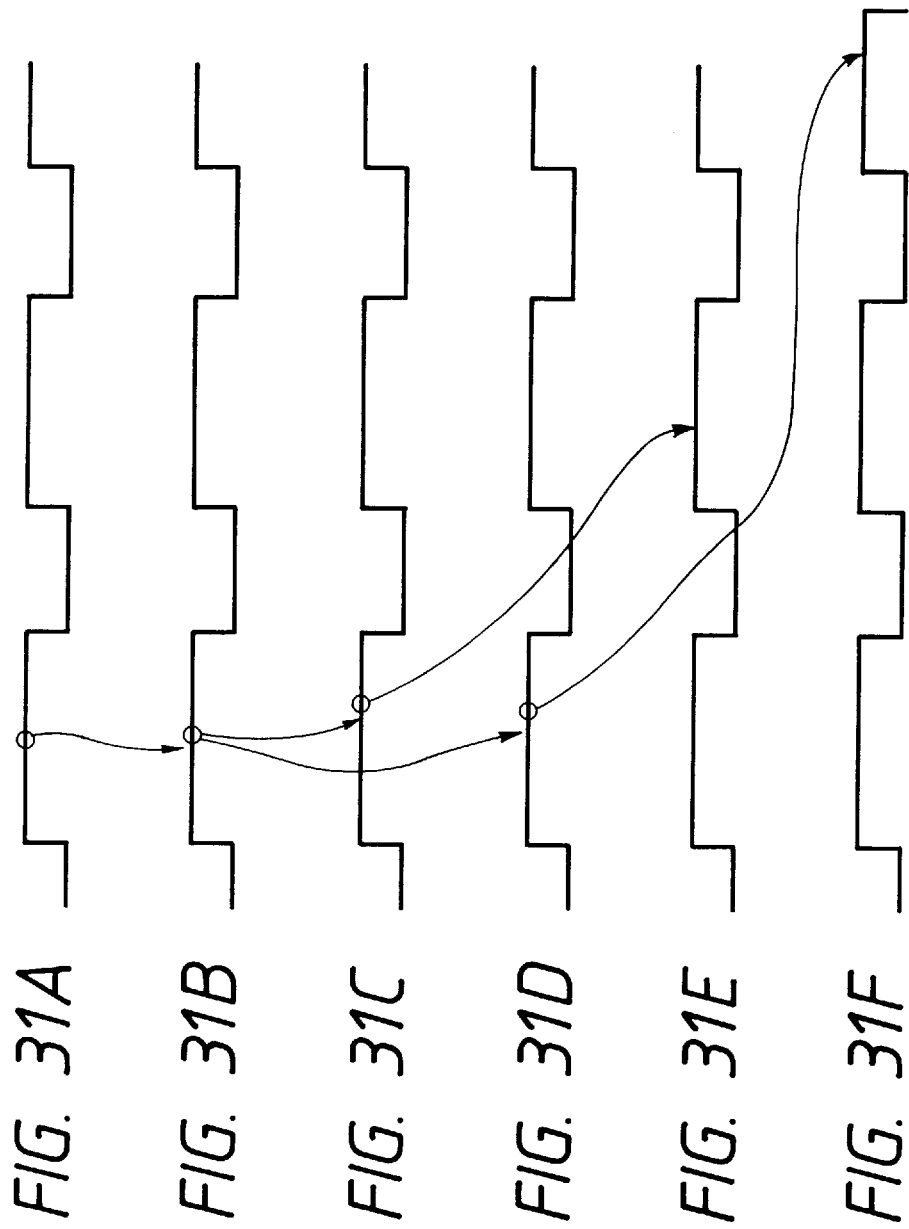
FIGS. 31A to 31F are timing charts showing examples of the timings from readout of image data to head driving when two heads are driven by using one HS data.

FIGS. 30A to 30F are timing charts showing the timings from data read from the image memory 505 to driving of the upper and lower heads when head shading (HS) correction is performed separately for the upper and lower heads. FIGS. 31A to 31F are timing charts showing the corresponding timings when the HS correction is performed by averaging the mixed density data. More specifically, FIGS. 30A and 31A show the image memory readout timing; FIGS. 30B and 31B, the HS (image processing) timing; FIGS. 30C and 31C, the lower head thinning data generation timing; FIGS. 30D and 31D, the upper head thinning data generation timing; FIGS. 30E and 31E, the lower head drive timing; and FIGS. 30F and 31F, the upper head drive timing. In performing separate density unevenness corrections in the multi-scan mode, HS is performed for each of the upper and lower heads for the same image data. Therefore, as in FIGS. 30A to 30F, the same data is read out twice from the image memory 505, and thinning data is formed for each of the readout data. Thereafter, head driving is performed at appropriate timings corresponding to the positions of the upper and lower heads in the subscan direction. On the other hand, when single HS data formed by averaging the mixed density data is to be used, as in FIGS. 31A to 31F, HS conversion is performed for image data read out from the image memory 505 at a single timing, and thinning data is formed for the upper and lower heads. Thereafter, the upper and lower heads are driven at proper timings.

The present invention is particularly suitably usable in an ink jet recording head and recording apparatus wherein thermal energy by an electrothermal transducer, laser beam or the like is used to cause a change of state of the ink to eject or discharge the ink. This is because the high density of the picture elements and the high resolution of the recording are possible.

The typical structure and the operational principle are preferably the ones disclosed in U.S. Pat. Nos. 4,723,129 and 4,740,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the production, development and contraction of the bubble, the liquid (ink) is ejected through an ejection outlet to produce at least one droplet. The driving signal is preferably in the form of a pulse, because the development and contraction of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion, as well as the structure of the combination of the ejection outlet, liquid passage and the electrothermal transducer as disclosed in the above-mentioned patents. In addition, the present invention is applicable to the structure disclosed in Japanese Laid-Open Patent Application No. 59-123670 wherein a common slit is used as the ejection outlet for plural electrothermal transducers, and to the structure disclosed in Japanese Laid-Open Patent Application No. 59-138461 wherein an opening for absorbing pressure wave of the thermal energy is formed corresponding to the ejection portion. This is because the present invention is effective to perform the recording operation with certainty and at high efficiency irrespective of the type of the recording head.

The present invention is effectively applicable to a so-called full-line type recording head having a length corresponding to the maximum recording width. Such a recording head may comprise a single recording head and plural recording head combined to cover the maximum width.

In addition, the present invention is applicable to a serial type recording head wherein the recording head is fixed on the main assembly, to a replaceable chip type recording head which is connected electrically with the main apparatus and can be supplied with the ink when it is mounted in the main assembly, or to a cartridge type recording head having an integral ink container.

The provisions of the recovery means and/or the auxiliary means for the preliminary operation are preferable, because they can further stabilize the effects of the present invention. As for such means, there are capping means for the recording head, cleaning means therefor, pressing or sucking means, preliminary heating means which may be the electrothermal transducer, an additional heating element or a combination thereof. Also, means for effecting preliminary ejection (not for the recording operation) can stabilize the recording operation.

As regards the variation of the recording head mountable, it may be a single corresponding to a single color ink, or may be plural corresponding to the plurality of ink materials having different recording color or density. The present invention is effectively applicable to an apparatus having at least one of a monochromatic mode mainly with black, a multi-color mode with different color ink materials and/or a full-color mode using the mixture of the colors, which may be an integrally formed recording unit or a combination of plural recording heads.

Furthermore, in the foregoing embodiment, the ink has been liquid. It may be, however, an ink material which is solidified below the room temperature but liquefied at the room temperature. Since the ink is controlled within the temperature not lower than 30° C. and not higher than 70° C. to stabilize the viscosity of the ink to provide the stabilized ejection in usual recording apparatus of this type, the ink may be such that it is liquid within the temperature range when the recording signal is the present invention is applicable to other types of ink. In one of them, the temperature rise due to the thermal energy is positively prevented by consuming it for the state change of the ink from the solid state to the liquid state. Another ink material is solidified when it is left, to prevent the evaporation of the ink. In either of the cases, the application of the recording signal producing thermal energy, the ink is liquefied, and the liquefied ink may be ejected. Another ink material may start to be solidified at the time when it reaches the recording material. The present invention is also applicable to such an ink material as is liquefied by the application of the thermal energy. Such an ink material may be retained as a liquid or solid material in through holes or recesses formed in a porous sheet as disclosed in Japanese Laid-Open Patent Application No. 54-56847 and Japanese Laid-Open Patent Application No. 60-71260. The sheet is faced to the electrothermal transducers. The most effective one for the ink materials described above is the film boiling system.

The ink jet recording apparatus may be used as an output terminal of an information processing apparatus such as computer or the like, as a copying apparatus combined with an image reader or the like, or as a facsimile machine having information sending and receiving functions.

While the invention has been described with reference to the structures disclosed herein, it is not confined to the details set forth and this application is intended to cover such modifications or changes as may come within the purposes of the improvements or the scope of the following claims.

According to the present invention as has been discussed above, one test image is formed by a plurality of printing heads provided for a printing agent of one given color. Density data obtained by reading this test image is averaged by the number of heads. On the basis of this average value, a common correction is performed for drive signals for the printing heads. This makes it possible to perform head density unevenness correction at a high efficiency in performing overlap printing by using these printing heads.

Also, the apparatus further comprises the means for causing the plurality of printing heads to form their respective test images, and the means for separately correcting drive signals for the printing heads on the basis of density data separately obtained by reading these test images. Therefore, density unevenness corrections are separately performed for the printing heads in non-overlap printing. This allows a proper correction corresponding to each print mode.

What is claimed is:

1. An image output apparatus which outputs an image on a printing medium by using a plurality of printing heads provided for a printing agent of one color and each having a plurality of printing elements, comprising:

image forming means for causing said printing heads to form a test image, wherein the test image is a test image formed by performing overlap printing by using said printing heads;

reading means for reading the test image formed by said image forming means; and correcting means for correcting an image signal corresponding to an image to be recorded, based on a result of reading of the test image by said reading means, wherein an amount of correction performed by said correcting means is common to said plurality of printing heads, corresponding to an image formed by performing overlap printing by using said printing heads.

2. An apparatus according to claim 1, wherein said correcting means averages density data which is obtained by reading the test image, by number of said printing heads, and performs the common correction based on a resulting average value.

3. An apparatus according to claim 1, further comprising:

second image forming means for causing said printing heads to form respective test images; and second correcting means for separately correcting image signals corresponding to said printing heads based on individual density data obtained by reading the test images.

4. An apparatus according to claim 3, wherein said second correcting means separately, time-divisionally corrects the image signals corresponding to said printing heads.

5. An apparatus according to claim 3, wherein said printing heads are arranged in a conveyance direction of the printing medium to allow overlap printing or non-overlap printing on the printing medium using said printing heads, and further comprising control means for performing the common correction when the overlap printing is to be executed, and the separate correction when the non-overlap printing is to be executed.

6. An apparatus according to claim 1, wherein at least two said printing heads are provided for each of plural printing agents of different colors.

7. An apparatus according to claim 1, wherein said printing heads use an ink as the printing agent and eject the ink.

8. An apparatus according to claim 7, wherein said printing heads eject the ink by using thermal energy.

9. An apparatus according to claim 1, wherein said correcting means corrects drive signals to be supplied to said printing heads.

10. An image forming system comprising an image output apparatus which outputs an image on a printing medium by using a plurality of printing heads provided for a printing agent of one color and each having a plurality of printing elements, and an image supply apparatus for supplying image data relating to printing to said image output apparatus, said image output apparatus comprising:

image forming means for causing said printing heads to form a test image;

reading means for reading the test image formed by said image forming means; and correcting means for performing a common correction for image signals corresponding to said printing heads based on a result of reading obtained by said reading means, wherein said printing heads are arranged in a conveyance direction of the printing medium to allow overlap printing or non-overlap printing on the printing medium using said printing heads, the common correction being performed when the overlap printing is to be executed, and separate correction being performed when non-overlap printing is to be executed, and wherein said image supply apparatus supplies to said image output apparatus a command for performing the overlap printing or the non-overlap printing, in addition to the image data to be printed.

11. An image output method which outputs an image on a printing medium by using a plurality of printing heads provided for a printing agent of one color and each having a plurality of printing elements, comprising the steps of:

causing the printing heads to form a test image, wherein the test image is one test image formed by performing overlap printing by using the printing heads;

reading the test image formed in said image forming step; and correcting an image signal corresponding to an image to be recorded, based on a result obtained in said reading steps, wherein in said correcting step, an amount of correction is common to said plurality of printing heads, corresponding to an image formed by performing overlap printing by using said recording heads.

12. A method according to claim 11, wherein the correcting step averages density data which is obtained by reading the test image, by number of said printing heads, and performs the common correction based on a resulting average value.

13. A method according to claim 11, further comprising:

a second image forming step of causing said printing heads to form respective test images; and a second correcting step of separately correcting image signals corresponding to said printing heads on the basis of individual density data obtained by reading the test images.

14. A method according to claim 13, wherein the second correcting step separately, time-divisionally corrects the image signals corresponding to said printing heads.

15. A method according to claim 13, wherein said printing heads are arranged in a conveyance direction of the printing medium to allow overlap printing or non-overlap printing on the printing medium using said printing heads, and further comprising a control step of performing the common correction when the overlap printing is to be executed, and separate correction when the non-overlap printing is to be executed.

16. A method according to claim 11, wherein at least two said printing heads are provided for each of plural printing agents of different colors.

17. A method according to claim 11, wherein said printing heads use an ink as the printing agent and eject the ink.

18. A method according to claim 17, wherein said printing heads eject the ink by using thermal energy.

19. A method according to claim 11, wherein the printing medium is cloth.

20. A method according to claim 11, wherein the correcting step corrects drive signals to be supplied to said printing heads.

21. A method according to claim 11, further comprising the step of fixing an ink on a printing medium after image output is performed by applying the ink on the printing medium.

22. A method according to claim 21, further comprising, after the ink fixing step, a step of cleaning the printing medium subjected to printing.

23. A method according to claim 11, further comprising a pretreatment step of causing the printing medium to contain a pretreating agent before printing is performed by ejecting an ink from said printing heads.

\* \* \* \* \*